United States Patent
Erskine et al.

(10) Patent No.: US 7,418,252 B2
(45) Date of Patent: Aug. 26, 2008

(54) SUBSCRIBER MANAGEMENT AND ACCOUNTING USING EVENT DETECTION IN A WIRELESS DEVICE

(75) Inventors: Thomas Erskine, Marblehead, MA (US); Luther Rudisill, Parker, TX (US); Kenneth Sonberg, Andover, MA (US)

(73) Assignee: Boston Communications Group, Inc., Woburn, MA (US)

( * ) Notice: Subject to any disclaimer, the term of this patent is extended or adjusted under 35 U.S.C. 154(b) by 158 days.

(21) Appl. No.: 10/917,259

(22) Filed: Aug. 12, 2004

(65) Prior Publication Data
US 2005/0107066 A1     May 19, 2005

Related U.S. Application Data

(60) Provisional application No. 60/495,642, filed on Aug. 15, 2003.

(51) Int. Cl.
*H04M 11/00*     (2006.01)

(52) U.S. Cl. .................. 455/405; 455/406; 455/407; 455/408; 455/418; 455/419; 455/437; 455/438

(58) Field of Classification Search ......... 455/405–408, 455/418, 419, 437, 438; 379/111–134
See application file for complete search history.

(56) References Cited

U.S. PATENT DOCUMENTS

| | | | | |
|---|---|---|---|---|
| 5,748,720 A * | 5/1998 | Loder | .......................... | 455/406 |
| 5,878,337 A | 3/1999 | Joao et al. | ................... | 455/406 |
| 5,889,770 A * | 3/1999 | Jokiaho et al. | ............. | 370/337 |
| 5,903,830 A | 5/1999 | Joao et al. | ................... | 455/506 |
| 6,337,977 B1 * | 1/2002 | Ranta | ........................ | 455/413 |
| 6,445,783 B1 | 9/2002 | Creswell et al. | ........ | 379/207.13 |
| 6,466,660 B1 * | 10/2002 | Merriam | ..................... | 379/126 |
| 6,529,725 B1 | 3/2003 | Joao et al. | ................... | 455/406 |
| 6,725,031 B2 | 4/2004 | Watler et al. | ................ | 455/414 |
| 7,016,665 B2 * | 3/2006 | Tamaki et al. | ............... | 455/406 |
| 2002/0022471 A1 | 2/2002 | Walter et al. | ................ | 455/405 |
| 2002/0025797 A1 | 2/2002 | Joao et al. | ................... | 455/406 |
| 2002/0120779 A1 * | 8/2002 | Teeple et al. | ................ | 709/246 |
| 2002/0147002 A1 * | 10/2002 | Trop et al. | ................... | 455/406 |
| 2004/0123147 A1 | 6/2004 | White | ........................ | 713/201 |
| 2004/0132438 A1 | 7/2004 | White | ........................ | 455/418 |
| 2004/0176104 A1 * | 9/2004 | Arcens | ..................... | 455/456.3 |
| 2004/0185830 A1 | 9/2004 | Joao et al. | ................... | 455/410 |
| 2004/0203584 A1 | 10/2004 | White | ........................ | 455/406 |
| 2004/0203955 A1 | 10/2004 | White | ........................ | 455/466 |
| 2005/0009500 A1 * | 1/2005 | Ear | ............................. | 455/408 |
| 2005/0026592 A1 | 2/2005 | Walter et al. | ................ | 455/406 |

OTHER PUBLICATIONS

U.S. Appl. No. 60/481,428, filed May 5, 2005, Ackley.

* cited by examiner

*Primary Examiner*—Duc Nguyen
*Assistant Examiner*—Justin Y Lee
(74) *Attorney, Agent, or Firm*—Weingarten, Schurgin, Gagnebin & Lebovici LLP

(57) ABSTRACT

A system and method performs real-time subscriber management and accounting for a wireless device by detecting predetermined events within the wireless device and communicating information pertaining to such events from the wireless device to a real-time subscriber management platform in association with each communication session. The information received by the real-time subscriber management platform is used to control the behavior of the wireless device and/or to update accounting information pertaining to the subscriber.

99 Claims, 8 Drawing Sheets

SUBSCRIBER MANAGEMENT AND ACCOUNTING USING EVENT DETECTION IN A WIRELESS DEVICE

CROSS REFERENCE TO RELATED APPLICATIONS

This application claims the benefit under 35 U.S.C. §119 (e) of Provisional Patent Application No. 60/495,642, filed Aug. 15, 2003 and titled EXTENDED INTELLIGENT NETWORK CALL CONTROL USING TRIGGERS RESIDENT IN A WIRELESS DEVICE WITHIN A WIRELESS COMMUNICATION NETWORK.

STATEMENT REGARDING FEDERALLY SPONSORED RESEARCH OR DEVELOPMENT

Not Applicable

BACKGROUND OF THE INVENTION

The present invention pertains to a system and method for controlling the operation of a wireless device in a communication network and more specifically to a system and method that controls the operation of the wireless device using controls disposed within the wireless device that are cooperative with a subscriber management platform or server.

Wireless communication networks have been widely deployed for over a decade. Over time, telecommunications networks have evolved from switch-based networks, in which switches included both data and control plane capability, to networks known as Intelligent Networks (IN), in which the control plane is separated from the data plane. In an IN, the intelligence and control functions are removed from the switches and reside in SS7 control elements, such as Service Switching Points, Signal Transfer Points and Service Control Points, as known in the art.

In conventional wireless communication networks, a call detail record is generated at the serving switch at the conclusion of each call. The call detail records are forwarded to a central database before being communicated to the serving or billing carrier or accounting service. As a consequence, delays in performing accounting are introduced.

BRIEF SUMMARY OF THE INVENTION

In accordance with the present invention, a system and method for controlling the behavior of a wireless device within a wireless communications network is disclosed. In one embodiment of the presently disclosed system, a subscriber identity module (SIM) or other removable processor/memory module is disposed in a handset housing and is electrically coupled to the handset logic. The SIM includes an application program (SIMapp) that interacts with and allows a real-time subscriber management (RTSM) platform to control the operation of the service. The RTSM platform comprises one or more servers, databases and control software that are employed for wireless service accounting and control functions. The RTSM platform has connectivity to a wireless operator's SS7 network via a service control point.

More specifically, the SIMapp application executing on a processor within the SIM performs functions in conjunction with the RTSM platform that permit real-time subscriber management and accounting in a way that minimizes implementation and/or integration requirements on the wireless operator's existing infrastructure.

The SIM is communicably coupled to the handset logic of the mobile equipment (ME) via a SIM Application Toolkit Application Programming Interface (SAT API), which is typically supplied by the supplier of the mobile equipment. The SIMapp application is therefore capable of communicating with the handset logic to control the handset, obtain notifications of call events and to issue commands to the handset logic through the SAT API to initiate wireless communications between the wireless device and the RTSM platform via a data messaging protocol, such as a data bearer channel communication protocol. Conversely, information sent from the RTSM platform is received by the handset logic and routed to the SIMapp application via the SAT API. Based on the above-described communication among the SIMapp, the handset logic and the RTSM platform, the subscriber's wireless communication experience can be controlled. This control is achieved without requiring Intelligent Network triggers or loop-back trunks.

Other features, aspects and advantages of the presently disclosed apparatus and method will be apparent to those of ordinary skill in the art from the Detailed Description of the Invention that follows.

BRIEF DESCRIPTION OF THE SEVERAL VIEWS OF THE DRAWINGS

The invention will be more fully understood by reference to the following Detailed Description of the Invention in conjunction with the drawings of which.

DETAILED DESCRIPTION OF THE INVENTION

U.S. Provisional Patent Application No. 60/495,642, titled Extended Intelligent Network Call Control Using Triggers Resident in a Wireless Device Within a Wireless Communication Network, filed Aug. 15, 2003, U.S. Provisional Patent Application No. 60/449,907, titled Method and System for Exercising Supervisory Control Over Wireless Phone Usage, filed Feb. 25, 2003, and U.S. patent application Ser. No. 10/784,611, titled Method and System for Providing Supervisory Control for Wireless Phone Usage, filed Feb. 23, 2004 are hereby incorporated by reference herein.

In accordance with the present invention, a method and apparatus for controlling the behavior of a wireless device and performing real-time subscriber management and accounting functions is disclosed. Predetermined events are detected within the wireless device and specific information pertaining to such events is stored. The stored information or information derived from the stored information is communicated to the RTSM platform, either in response to the occurrence of the event that caused the information to be stored or, alternatively, at the end of a call. The information communicated to the RTSM platform is communicated via a data message sent over, for example, a data bearer communication channel. In the illustrated embodiment, the information communicated includes counter values and associated information that is employed by the RTSM platform to determine the time, date and duration of a call. It should be understood that stored information need not be conveyed by the data message in all embodiments and that, in some systems, information indicating that a predetermined event has occurred may be conveyed to the RTSM platform via the data message. The information pertaining to calls and/or events detected by the SIMapp on the wireless device are communicated to the RTSM platform and employed by the RTSM platform for call accounting and subscriber management functions, as subsequently discussed in greater detail. For example, the SIMapp sends a Service Start Invoke message to the RTSM platform when a service that requires pre-authorization and that involves the wireless device is initiated. The RTSM platform maintains call tariff data, available balance amounts for prepaid subscriber accounts and information defining how calls involving specific subscribers are to be accounted for and processed.

Figure 1:
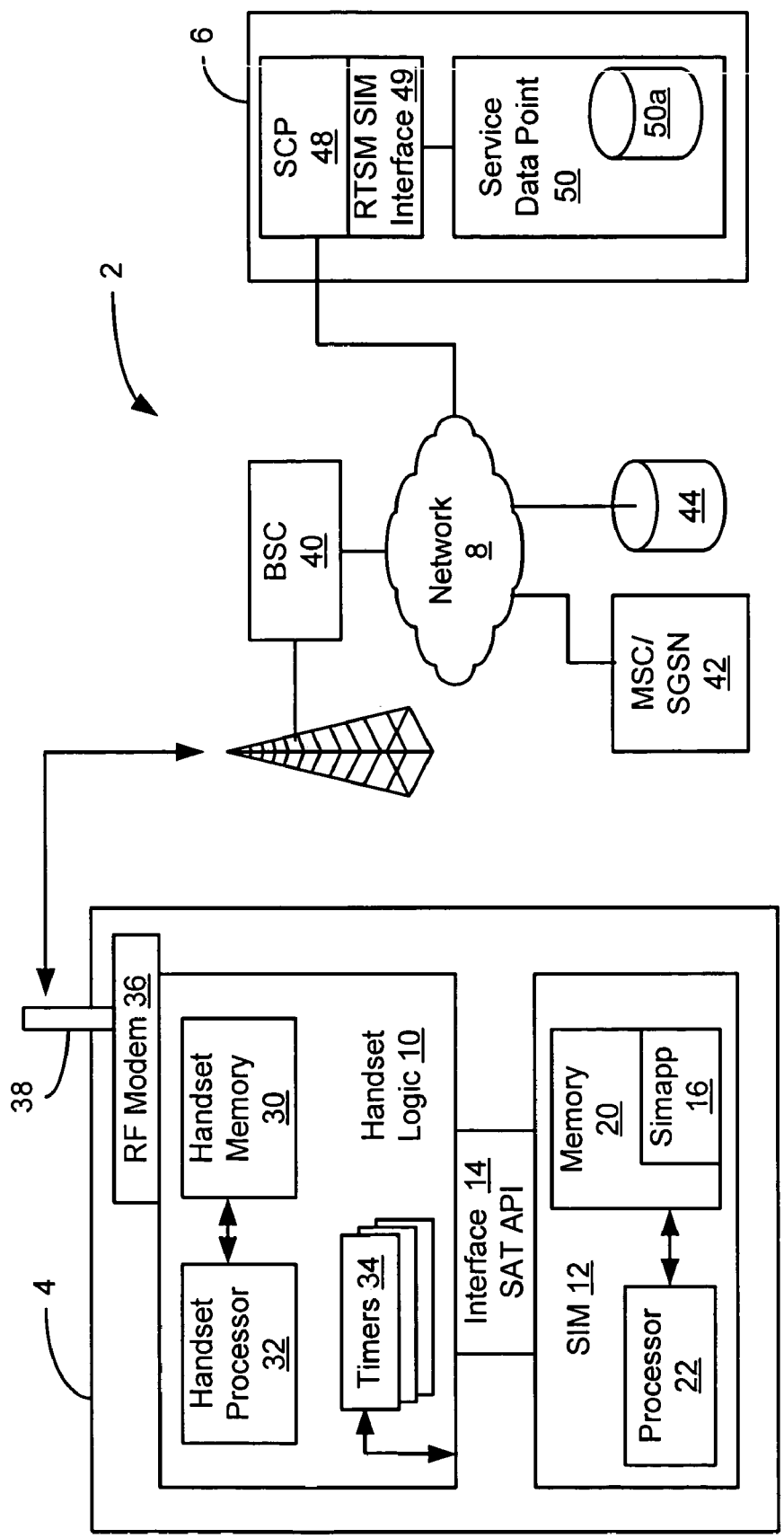
FIG. 1 is a block diagram of a system operative in accordance with the present invention.

Referring to FIG. 1, the presently disclosed system 2 includes a wireless device 4 in communication with the RTSM platform 6 via a communications network 8. In the illustrated embodiment, the wireless device 4 includes handset logic 10, a subscriber identity module (SIM) 12 and an interface 14 between the SIM 12 and the handset logic 10. The SIM 12 is removably inserted into the wireless device 4 housing. The SIM 12 includes a processor 22 and a memory 20. (Other removable memory/processor modules, such as USIMs or R-UIMs, are also acceptable, although for simplicity, an embodiment that utilizes a SIM will be described.) The processor 22 within the SIM 12 executes an application program 16, referred to herein as the SIMapp, that is stored within the memory 20 of the SIM 12.

The RTSM platform 6 comprises one or more servers that each include at least one processor and at least one memory. The RTSM platform 6 further includes a database (DB) 50a. The RTSM platform is operative as a real-time transaction processing system that interacts with the SIMapp 16 to perform call accounting and subscriber management functions, as subsequently discussed in greater detail.

The SIM 12 includes a memory 20 and a SIM processor 22 that executes the SIM application (SIMapp) 16 resident in the SIM memory 20. The memory 20 includes a re-writable portion, a non-volatile RAM portion and, additionally, may include volatile RAM.

A handset processor 32 is operative to execute software code and/or firmware stored within a handset memory 30. The handset logic 10 further includes a plurality of timers 34 (identified as timers 34a-34n) and 35, which are used to perform timing functions used by the SIMapp 16. In one embodiment of the presently disclosed system, the timers 34a-34n and 35 may be loaded and read under the command of the SIMapp 16.

A radio-frequency (RF) modem 36 is coupled between the handset logic 10 and an antenna 38. The RF modem 36 receives RF signals and converts the received RF signals to digital signals that are conveyed to the handset logic 10. Additionally, the RF modem 36 converts digital signals to RF signals that are transmitted from the handset logic 10 via the antenna 38.

The interface 14 between the SIM 12 and the handset logic 10 includes an Application Programming Interface known as the SIM Application Toolkit Application Programming Interface (SAT API), which is typically supplied by the supplier of the mobile equipment. The SAT API enables the SIMapp 16 to command the handset logic 10 to initiate communications with the RTSM platform 6 and to load and read the timers 34a-34n and 35. Additionally, the SAT API allows information that is sent from the RTSM platform 6 and received by the handset logic 10 to be passed via the SAT API to the SIMapp 16. Based on these communications, the SIMapp 16, in cooperation with the RTSM platform 6, is able to control the behavior of the wireless device 4.

The wireless device 4 communicates with a wireless operator's network, which includes a Base Station Controller (BSC) 40, a Mobile Switching Center (MSC) 42, and a Home Location Register (HLR) 44. These network elements are communicably coupled by the wireless operator's network or control channel 8, such as an SS7 telecommunications network. The RTSM platform 6 is coupled to the operator's control channel via a Service Control Point (SCP) 48 where the control channel comprises an SS7 network.

The SIMapp 16 provides the ability to:
 a) conditionally restrict the wireless device 4 from initiating mobile originated (MO) voice calls;
 b) conditionally restrict the wireless device 4 from receiving mobile terminated (MT) voice calls;
 c) conditionally send call detail information to the RTSM platform 6 when a voice call is disconnected; and
 d) conditionally send subscriber location information to the RTSM platform 6 on power-up and when the location of the handset 4 changes.

The manner by which the above-referenced capabilities are provided are discussed in greater detail below.

The SIMapp 16 within the wireless device 4 initiates most of the communications between the SIMapp 16 and the RTSM platform 6. Communication between the SIMapp 16 and the RTSM platform 6 occurs through the exchange of data messages.

By way of example and not limitation, communication between the SIMapp 16 and the RTSM platform 6 may be via the Short Messaging Service (SMS) using the Short Message Peer-to-peer Protocol (SMPP), SMS via Mobile Application Part (MAP), Unstructured Supplemental Services Data (USSD) via Transaction Capability User Part (TCAP) or any other suitable over-the-air data messaging protocol. Exemplary protocols are discussed further below.

SMS Via SMPP

In this scenario, the SIMapp 16 uses the SEND SS proactive command from the SAT API to command the handset logic 10 to generate an SMS-SUBMIT into the serving network. The SMS message is routed to the appropriate serving short message service center (SMSC) and is routed via a standard protocol for SMS messaging known as Simple Mail Point to Point (SMPP), eventually arriving at an SMPP Gateway (not shown) in communication with the RTSM platform 6. The SMPP Gateway in communication with the RTSM platform 6 communicates with the SDP 50 of the RTSM platform 6 (see FIG. 1), which generates a response. The response is forwarded via SMPP and eventually arrives at the appropriate serving SMSC. The SMS-DELIVER is received by the handset logic 10 and routed to the SIMapp 16, completing the transaction. This scenario uses the wireless network's existing SMS infrastructure.

SMS Via MAP

In this scenario, the SMS-SUBMIT bypasses the operator's existing SMS infrastructure and is sent directly over the SS7 network to the RTSM platform 6. The RTSM platform 6 formats a response, and sends the appropriate MAP transaction so the serving MSC 42 delivers the response as an SMS-DELIVER to the wireless device 4. The RTSM platform 6 performs a subset of the functions of an SMSC for both the requests and responses, reducing both the network latency and operational cost. For example, the SMSC the within the RTSM platform 6 queries an HLR to determine the servicing MSC 42, so the MAP transaction can be correctly addressed. However, the SMSC need not implement a store-and-forward capability. The carrier assigns the RTSM platform 6 a E.164 number, so SMS messages can be addressed to the platform. The carrier provisions this number into the SIM 12, so the SIMapp 16 can address SMS messages to the RTSM platform 6. In addition, the carrier assigns an SMSC address to the SMSC within the RTSM platform 6. The messaging between the RTSM platform 6 and the SIMapp 16 may be via one or more intermediate SMSCs within the network, if the network latency and operational concerns are not significant.

USSD Via MAP

USSD provides an alternative to SMS for messaging between the SIMapp 16 and the RTSM platform 6. USSD is lightweight in nature, making it a desirable messaging protocol where supported. In one embodiment, USSD is employed to communicate from the SIMapp 16 to the RTSM platform 6 and SMS is employed for the reverse path.

Bearer Channel Via GPRS

In this embodiment, SIMapp 16 control messages are transported to and from the RTSM platform 6 via a GPRS data session initiated by the SIMapp 16.

Communication Between SIMapp and RTSM

Figure 2:
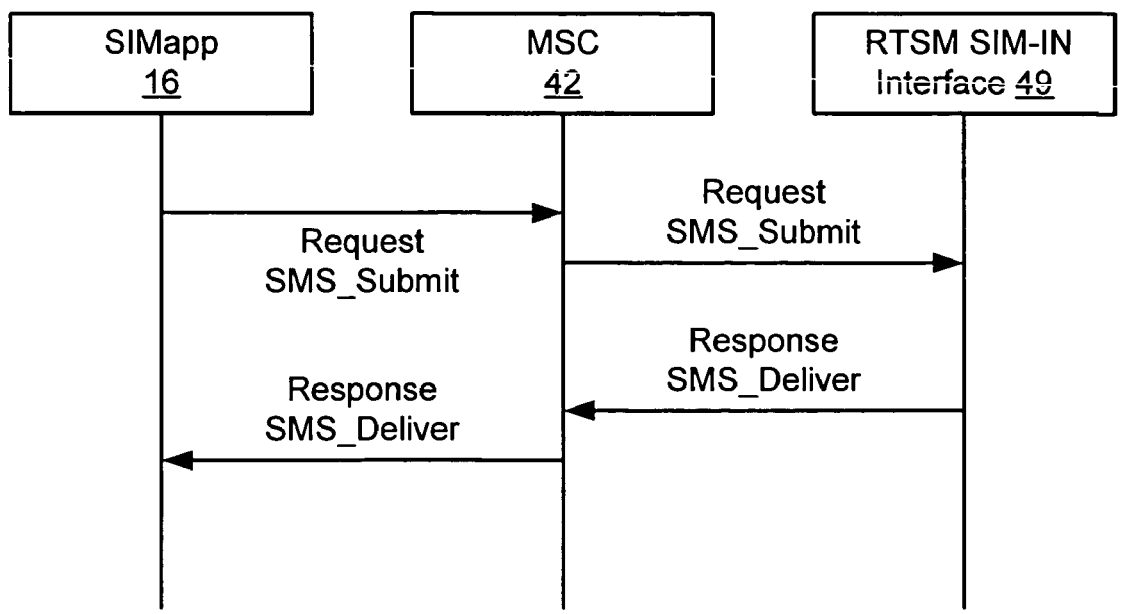
FIG. 2 is a diagram depicting an example of request and response messaging employed in the system of FIG. 1.

Communication between the SIMapp 16 and the RTSM platform 6 proceeds using a Request/Response model. FIG. 2 illustrates the basic communication technique in the circumstance in which data messaging is performed using an SMS bearer channel communication service. Referring to FIG. 2, when communication with the RTSM platform 6 is required, the SIMapp 16 instructs the handset logic 10 via the SAT API 14 to generate an SMS-SUBMIT message containing the message data. The MAP messaging for SMS is directed to the RTSM platform 6 by the MSC. SMS messages are addressed to phone numbers. The RTSM is assigned a E.164 number to facilitate addressing SMS messages to the RTSM. SMS messages that are destined to the SIMapp and are delivered to the wireless device are passed to the SIMapp, rather than being displayed on the screen of the wireless device, in a well-known manner. MAP Service Logic resident on the SCP 48 constitutes the RTSM SIMapp Interface 49 for communicating with the SIM 12. The RTSM SIMapp Interface 49 initiates an SMS-DELIVER message containing the response data and addresses it so that it is returned to the SIMapp 16 via the MSC 42.

As previously noted, the SIMapp 16 and RTSM 6 communicate using a request/response model. Each request is processed by the receiving system and a response is generated and returned to the initiator of the request. Requests initiated by the SIMapp 16 correspond to events that occur on the handset and generally correspond to the concept of triggers in an intelligent network (IN) system. Specific events may be detected as predetermined signals or messages within the wireless device. The RTSM platform 6 returns responses to these triggered events containing one or more directives that instruct the SIMapp 16 as to what action should be performed. The RTSM platform 6 can initiate the transmission of directives to the SIMapp 16 independent of the detection of call related events on the wireless device 4 without first receiving a request from the SIMapp 16.

Figure 3:
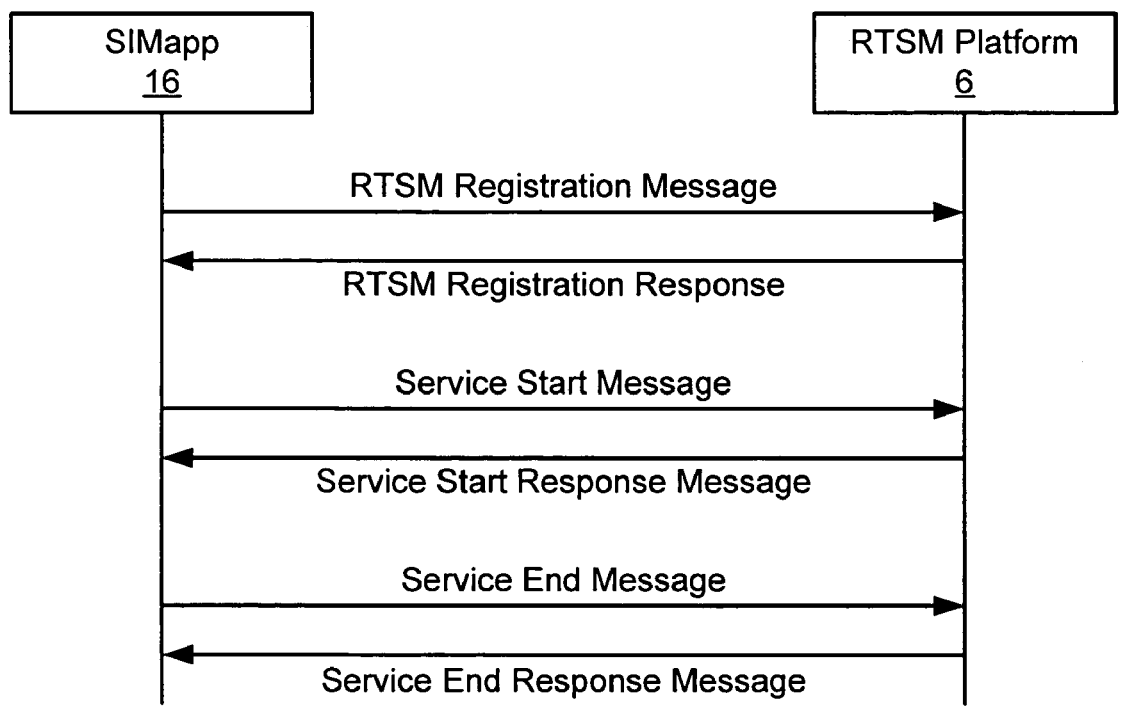
FIG. 3 is block diagram depicting message flow in the system of FIG. 1 between the SIMapp and the RTSM platform.

FIG. 3 depicts a simplified message diagram depicting messaging between the SIMapp 16 and the RTSM platform 6. Referring to FIG. 3, the subscriber powers up the wireless device 4. On power up, the SIMapp 16 sends an RTSM Registration message to the RTSM platform 6 containing location information, among other parameters. The RTSM platform 6 finds the profile and account for the subscriber and returns a Registration Response Message to the SIMapp 16 that includes configuration information for the SIMapp 16. If so configured, when the SIMapp 16 detects a change in location of the handset 4, it sends a message to the RTSM platform 6 containing new location information. Additionally, at any time, the RTSM platform 6 may send a message to the SIMapp 16 containing new configuration parameters to reconfigure the SIMapp 16.

In the event that the profile for the subscriber indicates that a pre-call authorization is to be performed for Mobile Originated (MO) attempts, the RTSM Registration Response includes an indication in a status element to this effect. The RTSM Registration Response also includes a text element that instructs the SIMapp 16 to display account information on the wireless device display. This information can include the subscriber's remaining balance and an indication of when those funds expire. As a matter of policy, some carriers limit the length of time unused funds remain in subscribers' accounts. After such time, the funds are transferred to the carrier, i.e., the funds expire. An exemplary indication of such a display is provided below.

Available Funds: $2.75
Expires: Nov. 17, 2003

When the SIMapp 16 detects certain predetermined events, the SIMapp 16 sends a message to the RTSM platform 6 indicating that the respective event has occurred. Upon detection of other specified events, the SIMapp 16 controls the wireless device to perform predetermined functions. For example, upon detection of a Call Control event in the form of the initiation of a mobile originated call, the SIMapp 16 forwards a data message to the RTSM platform 6 that contains data about the event, e.g. a dialed number. The response from the RTSM platform 6 instructs the SIMapp 16 how to proceed and may contain context data to be stored and returned with the response to another, related, event. For example, a Service Start Response may contain context data that is later returned with an associated Service End Invoke. The response may also include other instructions indicating how services are to be provided. The instructions contained in the response may set a maximum duration for the service instance, may allow the service instance, or may disallow the service instance. Additionally, the response from the RTSM platform 6 may specify warning tones or messages to be provided under specific circumstances.

More specifically, when the subscriber attempts to place a mobile originated (MO) call or the SIMapp 16 detects an incoming mobile terminated (MT) call, the SIMapp sends a Service Start Invoke Message to the RTSM platform 6 that contains the MSISDN of the wireless device 4, the dialed number, and, in one embodiment, may include information indicative of the location of the wireless device 4. Typically, phone location information is conveyed to the RTSM upon power up of the phone or upon a change in location of the wireless device 4, such as a change in cell site, cell site sector, or carrier, for example as the wireless device roams. The RTSM platform 6 determines if the subscriber can make or receive the call and returns a Service Start Response Message that indicates that the placement of the MO or MT call is to be allowed or disallowed.

In one embodiment, the SIMapp 16 delays completion of the call until it receives the Service Start Response Message. In this case, the SIMapp 16 either allows or disallows the call, based on the contents of the Service Start Response Message.

In another embodiment, the SIMapp 16 does not delay completion of the call. In this case, if a MT call is disallowed by the RTSM 6, the SIMapp 16 may receive the Service Start Response Message after (by as much as several seconds after) the call has been completed. If so, the SIMapp 16 ends the call upon receiving the Service Start Response Message.

In this embodiment, the SIMapp 16 ends MO calls immediately (generally before the calls are completed) and then waits for the service Start Response Messages. If a response message allows a MO call, the SIMapp 16 re-initiates the call in a manner that is transparent to the subscriber. The relatively short delay between the user dialing the digits of the called number and the re-initiation of the call by the SIMapp 16 is generally not noticeable to the subscriber.

On the other hand, if the Service Start Response Message indicates the MO call is disallowed, the SIMapp 16 does not re-initiate the call. Optionally, the SIMapp 16 issues an instruction to cause a tone or message to be played or displayed to the subscriber.

When the call ends, the SIMapp 16 detects this event and sends a Service End Invoke Message to the RTSM platform 6. The RTSM platform 6 rates the call using information contained in the Service End Invoke Message and call tariff data maintained at the RTSM platform 6 and debits the subscriber's account, which is also maintained at the RTSM platform 6. The RTSM platform 6 then returns a Service End Response Message to the SIMapp 16. The Service End Response Message includes text to be displayed on the subscriber's handset that indicates the available funds remaining in the subscriber's account and an indication of when those funds expire, as discussed above.

Available Funds: $0.25
Expires: Nov. 17, 2003

SIMapp to RTSM Message Set

Table 1 below identifies transactions that are initiated by the SIMapp 16:

TABLE 1

| Transaction | Message | Description |
|---|---|---|
| Registration | Registration Invoke | Generated by the SIMapp 16 on power up. Additionally, may be sent on location changes to retrieve configuration information and any initial instructions |
| | Response | Contains information indicating it is a response to a Registration Invoke |
| Service Start | Service Start Invoke | Generated by the SIMapp 16 when a service that requires pre-authorization is initiated. Possible services are: mobile originated (MO) call initiated mobile terminated (MT) call received |
| | Response | Contains information indicating it is a response to a Service Start |
| Service End | Service End Invoke | Generated by the SIMapp 16 when a service it is configured to report on has completed. Possible services are: MO call terminated MT call terminated |
| | Response | Contains information indicating it is a response to a Service End |

Each Invoke message contains information specific to that request. A single generic Response message can be used. The Response message can include a parameter to distinguish among the various transactions. A response may contain one or more directives that the SIMapp 16 is instructed to perform, as identified in Table 2 below.

TABLE 2

| Directive | Description |
|---|---|
| Status Change | Provides configuration information that determines how the SIMapp 16 behaves going forward. |
| Deny Service | Directs the SIMapp 16 to deny the current service |
| Allow Service | Directs the SIMapp to 16 allow the current service |
| Re-Route | Directs the SIMapp 16 to re-route the service to the specified address |
| Display Text | Directs the SIMapp 16 to display text on the handset |

The transaction identified in Table 3 below can be initiated by the RTSM platform 6:

TABLE 3

| Transaction | Description |
|---|---|
| Configuration Update | Generated by the RTSM platform 6 when the SIMapp 16 is to perform a directive independent of any subscriber activity. |

The Configuration Update Request from the RTSM platform 6 to the SIMapp 16 can contain directives that the SIMapp 16 is instructed to perform. The response from the SIMapp 16 contains status information.

Figure 4:
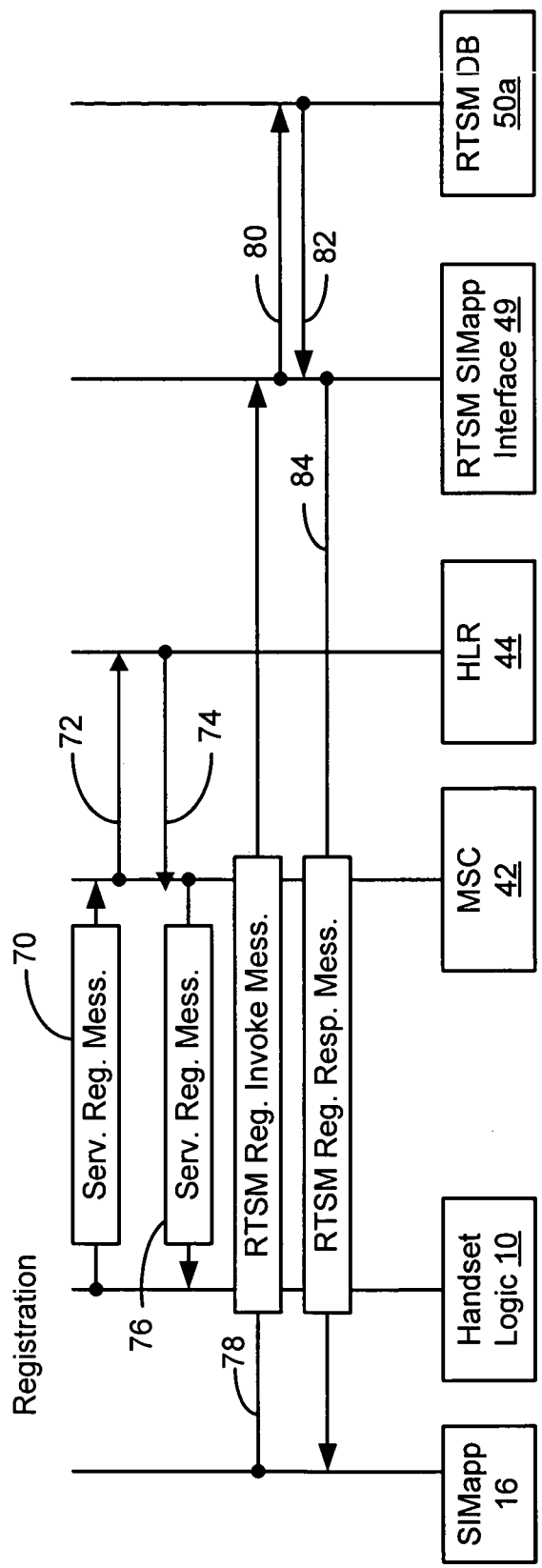
FIG. 4 is a diagram depicting the message flow employed in the registration of the wireless device depicted in FIG. 1.

FIG. 4 illustrates the registration process by which the wireless device 4 first registers with an MSC 42 and then registers with the RTSM platform 6. Referring to FIGS. 1 and 4, when the subscriber powers on the wireless device 4, the device receives transmissions from various MSCs 42 in its vicinity and determines which MSC 42 to utilize for communication, based upon the received system identifiers (SIDs) or other network and/or cell site identifying information (depending on the wireless protocol used by the wireless network) and signal strengths. As illustrated, via message 70, the wireless device 4 then registers with the selected MSC 42 via a registration protocol known in the art. The service registration protocol varies based upon the wireless protocol (e.g. GSM, iDEN, etc.) employed for communication.

The selected MSC 42 next queries the HLR 44 via a query message 72. In the instant case, it is assumed that the subscriber is configured in the HLR as a full-featured subscriber. A full-featured subscriber account can be provisioned as, for example, postpaid, postpaid with a spending limit, or any other suitable type. The HLR 44 returns the relevant subscriber status to the MSC 42. For example, in a GSM system, the HLR indicates whether service is or is not to be provided to the wireless device. The MSC 42 then communicates a registration message 76 to the handset logic 10 to complete the registration of the wireless device 4 with the MSC 42, so that the wireless device 4 can communicate over the network 8 with the MSC 42.

The SIMapp 16 can be configured in either of two states ("dormant" or "active"), and the state of the SIMapp can be changed by the carrier. In the dormant state, the SIMapp 16 does not receive notifications from the handset logic 10 and plays no role in controlling calls to or from the wireless device 4. In the dormant state, the SIMapp 16 does not interact with the RTSM platform 6 when calls are placed to or from the mobile device. Instead, the wireless device 4 acts as a normal full-featured wireless device.

In the active state, the SIMapp 16 receives notifications of call events from the handset logic 10. The SIMapp 16 can be further configured to react or not to react to the notifications from the handset logic 10. If the SIMapp 16 is configured not to react to these notifications, the SIMapp registers with the RTSM platform 6 (as described below), but otherwise ignores the notifications from the handset logic 10. On the other hand, if the if the SIMapp 16 is configured to react to these notifications, the SIMapp operates as described herein. The RTSM platform 6 can send messages to the SIMapp 16 to configure the SIMapp to either ignore or react to the notifications from the handset logic 10.

Thus, no changes are needed to the HLR 44 to support full-featured wireless devices and devices that are controlled by the RTSM platform 6. Wireless devices 4 that are controlled by the RTSM platform 6 can be provisioned in the HLR 44 as though they were full-featured devices. In addition, a given wireless device 4 can be changed from an unrestricted (for example postpaid or hybrid/spending limits) device to a restricted (for example prepaid) device, or vice versa, by changing the state of the SIMapp 16, but without requiring changes in the HLR 44. Furthermore, the same type of hardware, i.e. wireless devices 4 with SIMapp 16, can be dispensed to both full-featured subscribers and to subscribers whose wireless devices are to be controlled by the RTSM platform 6.

Assuming the SIMapp 16 is configured in an active state, following registration of the wireless device 4 with the MSC 42, the SIMapp 16 initiates the registration of the wireless device 4 with the RTSM platform 6 by forwarding an RTSM Registration Invoke Message 78. The Registration Invoke Message 78 includes location information that indicates the location of the wireless device 4 (such as the serving cell site ID) and the version and revision level of the SIMapp code. The wireless device 4 acquires location information through the wireless network 8, as is well known. In one embodiment, this location information includes a country code, an area code and a cell site ID. Other embodiments include information sufficient to enable the RTSM platform 6 to properly rate calls.

In response to receipt of the Registration Invoke Message 78, the RTSM SIMapp Interface 49 communicates with the RTSM platform 6 via a message 80 to store the information contained within the Registration Invoke Message 78 in the RTSM DB 50a. The RTSM platform 6 may return to the RTSM SIMapp Interface 49 in a message 82 an Internal Timer Value to be communicated to the SIMapp 16. The Internal Timer Value specifies a time to a known point in the future and is subsequently discussed in greater detail. The Internal Timer Value can be stored in the RTSM DB 50a, calculated on the fly or hard-coded in the RTSM platform 6 logic.

The RTSM SIMapp Interface 49 then forwards an RTSM Registration Response Message 84 to the SIMapp 16 via the SCP 48. The RTSM Registration Response Message includes a tag associated with the message being responded to that identifies the response and the Internal Timer Value, if such is provided.

When the SIMapp 16 receives the RTSM Registration Response Message 84 from the RTSM SIMapp Interface 49, if the message contains an Internal Timer Value, the SIMapp 16 loads the Internal Timer Value into countdown timer 34 and starts the countdown timer 34. The timer 34 is illustrated as a countdown timer, although it is recognized that other forms of timers may be substituted, such as count-up timers, in which the counter is initialized to 0 and the current counter value is compared to the Internal Timer Value to determine if the counter has expired.

If the Registration Response Message 84 does not include an Internal Timer Value, no timer values are sent to the RTSM platform 6 along with messages the SIMapp sends to indicate call initiation, etc. In this case, the RTSM platform 6 can use an internal timer to time calls. Alternatively, for services, such as wireless data browsing, call accounting can be performed based on the number of such requests, rather than on the durations of the requests.

Figure 5:
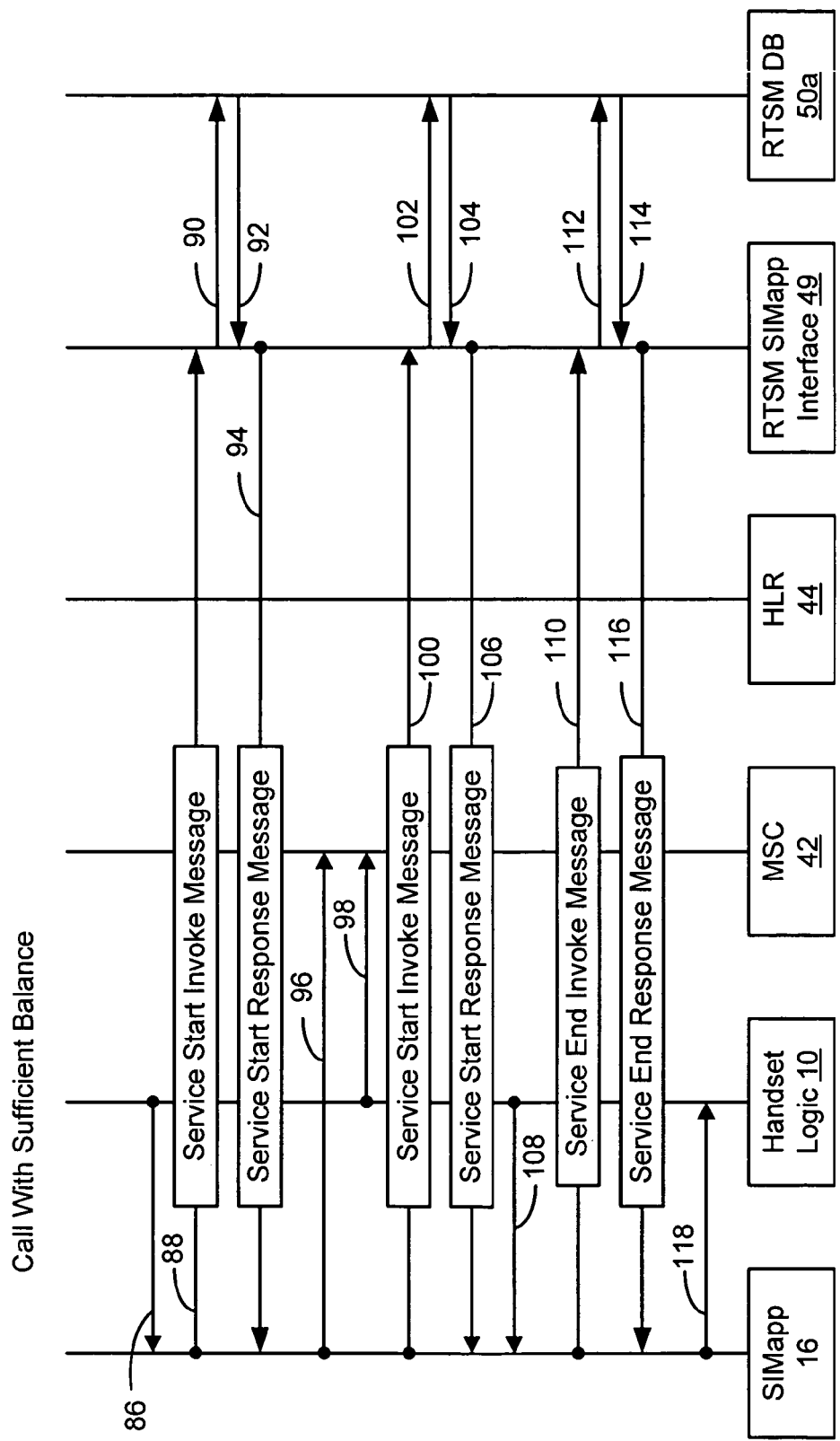
FIG. 5 is a diagram depicting the message flow in the system of FIG. 1 in response to a call for which a sufficient balance exists in the RTSM platform for billing through call completion.

FIG. 5 depicts the events and messaging in the presently disclosed system in response to a mobile originated or a mobile terminated call when the account balance in the RTSM platform 6 is sufficient for the call. When the subscriber presses the send button to initiate a call from the wireless device 4 (MO Call Control Event) or an incoming page to the wireless device 4 is received (MT Call Control Event), the respective Call Control vent is detected by the SIMapp 16 as illustrated by event 86. However, in one embodiment, the dialed digits are intercepted and not transmitted by the handset logic 10 to the MSC 42. Following the detection of the Call Control event by the SIMapp 16, the SIMapp 16 generates a Service Start Invoke Message and the handset logic 10 transmits the Service Start Invoke Message 88 to the SIMapp interface 49 on the RTSM platform 6. The Service Start Invoke Message includes a Service Start Message Tag that identifies the message as a Service Start Invoke Message, an indication of whether the call is a MO or a MT call, a dialed number string, and context information that uniquely identifies the SIMapp/RTSM communication context. Upon detection of the Call Control Event, the SIMapp 16 also reads the value of the countdown timer 34 and stores the value as an Internal Timer Value T1.

The RTSM SIMapp Interface 49 issues a query message 90 to the RTSM DB 50A (see FIG. 4). If adequate funds are present in the applicable prepaid account, the RTSM DB 50a communicates such information to the RTSM SIMapp Interface 49 in a message 92 and reserves a specified number of minutes as allotted time. This process is referred to as balance reservation. The message 92 to the RTSM SIMapp Interface 49 includes an indication of the call authorization and the minute reservation (allotted time).

The RTSM SIMapp Interface 49 forwards a Service Start Response Message 94 to the SIMapp 16 that includes the authorization, security information and the allotted time. In response, in one embodiment, the SIMapp 16 allows the dialed digits to be transmitted by the handset logic 10 to the MSC 42 (see FIG. 4) as depicted at message 98, and the SIMapp 16 starts an allotted time timer 35. In another embodiment, the dialed digits are transmitted by the handset logic 10, but the SIMapp 16 subsequently ends the call (typically before it is completed). Later, if the SIMapp 16 receives approval for the call from the RTSM platform 6, the SIMapp re-initiates the call in a manner that is transparent to the user. The allotted time timer 35 provides an indication when the allotted time timer equals the reserved number of minutes received in the Service Start Response Message 94.

Following the transmission of the dialed digits to the MSC 42 as depicted by event 96, if the call is a MO call, the call involving the wireless device 4 is connected to the called party to permit communication between the subscriber and the called party. The SIMapp 16 detects the connection of the call as a Call Connect Event. In response to the detection of the Call Connect Event, the SIMapp 16 reads the internal countdown timer 34 and stores the value as one component of T2.

In the event the allotted time timer 35 expires, indicating that the allotted time has been utilized, the SIMapp 16 sends another Service Start Invoke Message 100 to the RTSM SIMapp 49 Interface to request an additional reservation of time. The RTSM SIMapp Interface 49 queries the RTSM DB 50a, as illustrated by message 102, ascertains whether the account balance is adequate, and, if adequate, returns an authorization and minute reservation for communication to the SIMapp 16. The RTSM SIMapp Interface 49 sends a Service Start Response Message 106 to the SIMapp 16 that includes the authorization and new allotted time for storage in the SIMapp allotted time timer 35. The time reservation is stored in the allotted time timer 35 and the allotted time timer 35 is restarted.

When the call is disconnected, the SIMapp 16 detects this event as a Call Disconnect Event as illustrated by event 108. In response to the detection of the Call Disconnect Event by the SIMapp 16, the SIMapp reads the value of the internal countdown timer 34 and stores the value as a component of T3. The SIMapp 16 then generates a Service End Invoke Message that includes three data-sets, referred to herein as T1, T2 and T3, and the context information that is employed to identify the call.

The data-sets T1, T2 and T3 each contain a Timer Value Identifier that identifies the data-set, a counter value and a rollover count. The timer identifier in one embodiment is the number of the data-set, i.e. 1, 2 or 3. The counter value is an integer having a value greater than 0 that is read from the countdown timer 34. The counter value represents a duration in seconds between the-occurrence of the respective event and the end of a pre-specified period. The rollover count is an integer value, greater than or equal to 0. The rollover count indicates if the countdown timer 34 has expired since the wireless device 4 last registered with the RTSM platform 6. For example, assume the Internal Timer Value conveyed from the RTSM platform is 10000 seconds. The Internal Timer Value is loaded into the countdown timer 34 and the countdown timer 34 is started. Each time the countdown timer reaches 0, the countdown timer is reset to 10000 and the rollover count value is incremented.

The Service End Invoke Message 110 is then communicated to the RTSM SIMapp Interface 49 for use by the RTSM platform 6 in performing call rating, subscriber management and call accounting functions.

More specifically, the difference between the counter values in T1 and T3 may be employed by the RTSM platform 6 to determine the "Send to End" time, should accounting be performed on this basis. Alternatively, the RTSM platform 6 may ascertain the difference between the values T2 and T3 in the event call accounting is to be performed based on the duration between the Call Connect Event and the Call Disconnect Event.

It should be recognized that instead of T1, T2 and T3 in the Service End Invoke Message, the SIMapp 16 could alternatively communicate the duration between the appropriate starting point for call accounting (Call Control Event or Call Connect Event) and the Call Disconnect Event and forward the calculated duration to the RTSM platform 6 in the Service End Invoke Message 110. Additionally, the SIMapp 16 could forward the relevant timer values needed to calculate the duration value of interest for accounting in separate data messages in response to detection of the specific Call Control, Call Connect and Call Disconnect Events.

In an alternative embodiment, rather than receiving an Internal Timer Value from the RTSM platform 6, the SIMapp 16 uses real-time values to identify times of call control, call connect and call disconnect events. In such an embodiment, the SIMapp 16 ascertains the times of these events, such as by querying a clock in the handset logic 10, and the SIMapp conveys these times to the RTSM platform 6, with or without storing these values within the T1, T2 and T3 records.

The RTSM SIMapp Interface 49 obtains the call duration from the information contained in the Service End Invoke Message or as otherwise communicated to the RTSM platform 6 and updates the RTSM DB 50A to reflect the time used, as depicted by message 112. The RTSM platform 6 performs an accounting in real time based on call rating data maintained at the RTSM platform 6 and determines the balance remaining in the subscriber's account. The RTSM DB 5a communicates the remaining subscriber balance to the RTSM SIMapp interface 49 via message 114.

The RTSM SIMapp Interface 49 forwards a Service End Response Message 116 to the SIMapp 16 that includes a text message that specifies the subscriber balance for display by the handset logic 10. The SIMapp 16 displays the account balance on the handset logic 10 display, as depicted by event 118 in FIG. 5.

Figure 6:
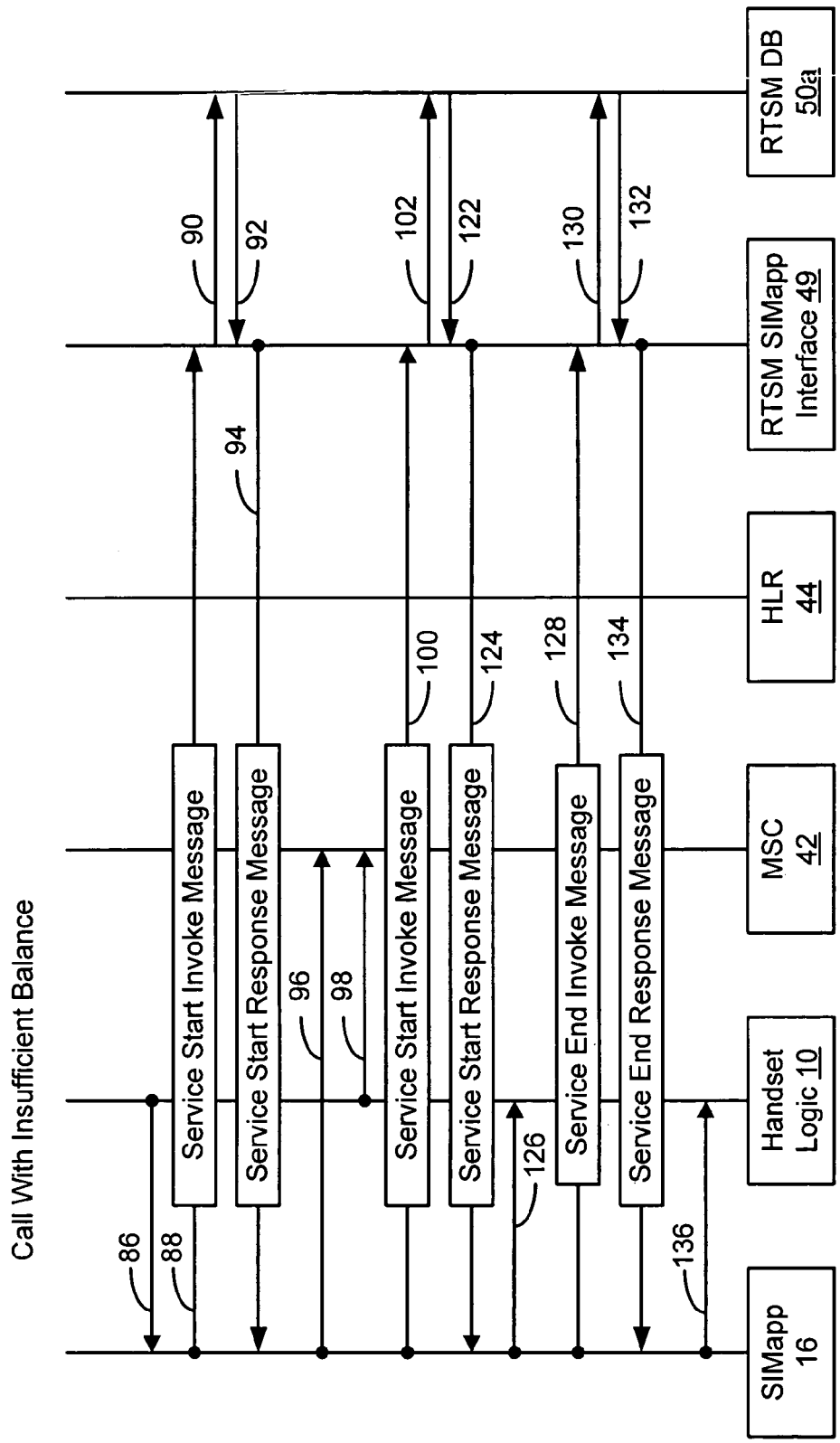
FIG. 6 is a diagram depicting the message flow in the system of FIG. 1 in response to a call for which an insufficient balance exists in the RTSM platform for billing through call completion.
Figure 7:
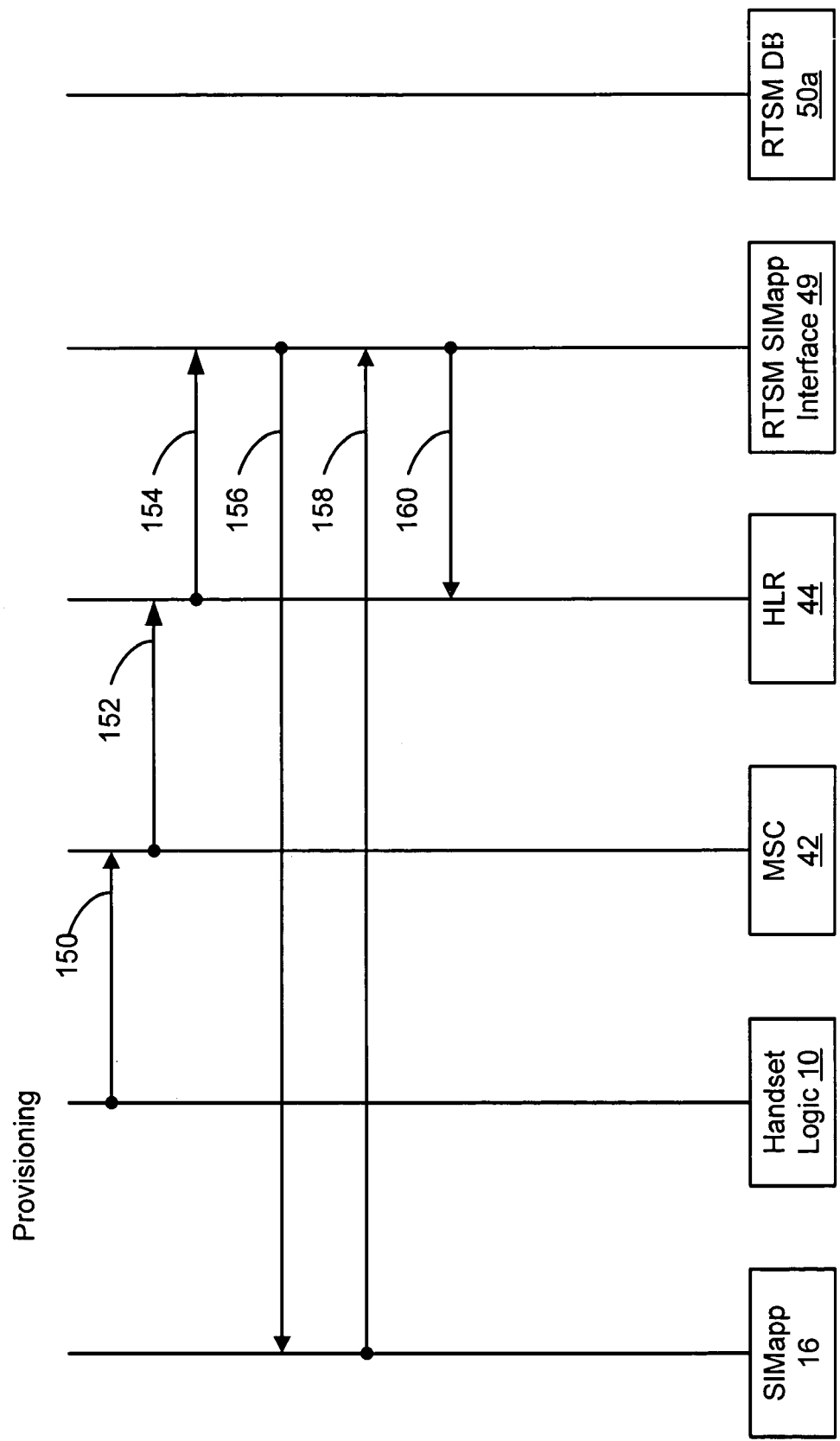
FIG. 7 is a diagram depicting message flow in the system of FIG. 1 to update the code image of the SIMapp within the wireless device.

FIG. 6 depicts the events and messaging in the presently disclosed system in response to a mobile originated or a mobile terminated call when the account balance in the RTSM platform 6 is not sufficient for the call. Referring to FIG. 6, events/messages 86 through 102 are as described with respect to FIG. 5, which depicts a call with a sufficient balance. In response to the query 102, the RTSM DB 50a returns a message 122 to the RTSM SIMapp Interface 49 that indicates that there are insufficient funds for the call to continue. In response to this indication, a Service Start Response Message 124 is returned to the SIMapp 16 by the RTSM SIMapp interface 49 that includes an insufficient funds indicator. Upon receipt of the insufficient funds indicator in the Service Start Response Message 124, the SIMapp 16 issues a command to the handset logic 10 to end the call. In response to this command, the call is ended, either immediately or after a predetermined time, such as one minute. The SIMapp 16 then forwards a Service End Invoke Message 128 to the RTSM SIMapp Interface 49 that includes the data-sets T1, T2, T3 and context information that identifies the call communications session. Upon receipt of the Service End Invoke Message 128, the RTSM SIMapp Interface 49 rates the call using duration information derived from the Service End Invoke Message 128 and call tariff information stored in the RTSM DB 50a and updates the RTSM DB 50a via an update message 130. The RTSM DB 50a determines the respective subscriber's account balance and returns this information to the RTSM SIMapp interface 49 in a message 132. The RTSM SIMapp interface 49 then returns a Service End Response Message 134 to the SIMapp 16 that includes text information that indicates the subscriber's remaining balance. The SIMapp 16 issues a command 136 to the handset logic 10 to display the remaining balance to the subscriber.

Countdown Timer Operation

The SIMapp 16 controls the countdown timer 34 that is resident in the wireless device for the purpose of determining time remaining to the end of a specified period. The countdown timer 34 may be implemented within the handset logic 10 and accessed via the SAT API interface 14 or, alternatively, may be implemented as logic within the SIM 12. As events occur, the value of the countdown timer 34 is read by the SIMapp 16 through the SAT API interface 14 and the respective timer value is associated with the event. Periodically, for example every 30 seconds, the value of the countdown timer is recorded to a memory, in case of a subsequent unexpected power loss.

The SIMapp 16 can be configured to send messages to the RTSM platform 6 at the end of each call. Alternatively, it should be recognized that the SIMapp 16 may be configured to send a message to the RTSM platform 6 in response to the detection of any predetermined event or in association with the detection of a call. In the presently illustrated embodiment, the information conveyed includes the three (3) timer values T1, T2, and T3 as discussed above. The T1 timer value is recorded by the SIMapp 16 at the time of Call Control (call initiation for a MO call; page of handset for a MT call). The T2 timer value is recorded by the SIMapp at the time the call is connected for either a MO or a MT call. The T3 timer value is recorded at the time the call ends for either a MO or a MT call.

Power Loss Detection and Processing

The SIMapp 16 is capable of recovering correctly from an unexpected loss of power. This is sometimes referred to as a "battery pull" scenario, because one possible way for this situation to occur is as a result of the physical removal of the battery from a wireless device during a call. If power is lost during a call, and the SIMapp 16 is configured to notify the RTSM platform 6 when the call is completed, the SIMapp 16 sends call detail information to the RTSM platform 6 the next time the wireless device 4 powers up.

During the course of a call, the SIMapp 16 records the counter and rollover values for T1, T2 and T3 in non-volatile memory. The SIMapp 16 periodically updates the counter value and the rollover count value of T3 as the call continues. Updates are performed at an interval that provides reasonable granularity while not degrading handset performance. The counter and rollover values of T3 are set to the values of T2 when T2 is populated, so that if a power loss occurs before T3 is updated for the first time, the values of T2 and T3 are the same.

If, on power up, the SIMapp 16 detects that a power loss scenario has occurred, the SIMapp 16 uses the saved values of T1, T2 and T3 to construct a Service End Invoke Message for the call that was in progress. The SIMapp subtracts one "update interval" from T3 before populating the Service End Invoke Message, e.g. the SIMapp 16 subtracts the amount of time within the update period (30 seconds in the present example) from the last saved counter value of T3. This essentially rounds T3 towards the next whole "update interval." The operation of the SIMapp 16 in the event of a power loss is discussed in further detail in connection with flow diagrams of FIGS. 8 and 9.

Timer Support at Registration

Figure 8:
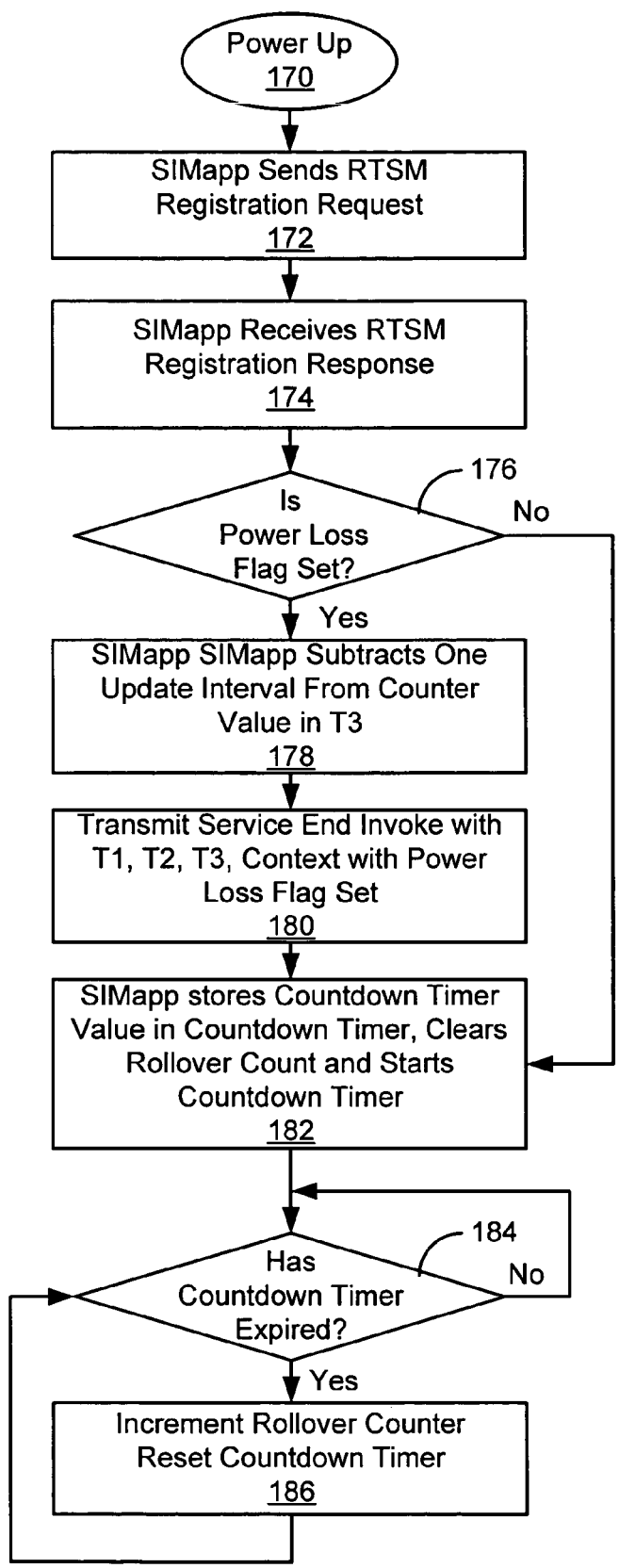
FIG. 8 is a flow diagram depicting countdown timer operation.

FIG. 8 illustrates the steps involved at registration that pertain to countdown timer 34 initiation and power loss processing. As depicted at step 170, the wireless device 4 is powered up. Following power up of the wireless device 4, the SIMapp 16 forwards an RTSM Registration Request Message to the RTSM SIMapp Interface 49 as illustrated in step 172. In response to the transmission of the RTSM Registration Request Message, the SIMapp 16 receives a Registration Response Message that may include an Internal Timer Value to be stored within the countdown timer 34, as depicted at step 174. As shown at decision step 176, the SIMapp 16 tests a Power Loss Flag stored by the SIMapp 16 to determine if data-sets pertaining to a prior call were not communicated to the RTSM platform 6 due to a power loss. If the Power Loss Flag indicates that T1, T2 and T3 data-sets were not previously communicated to the RTSM platform 6, the SIMapp 16 subtracts one update interval from the counter value T3 (30 seconds in the illustrated embodiment), as illustrated in step 178. The SIMapp 16 then transmits a Service End Invoke Message to the RTSM platform 6 that includes the data-sets T1, T2 and T3, context information that identifies the communication session and a tag that indicates the Service End Invoke Message pertains to a power loss scenario, as shown in step 180.

In response to receipt of the Service End Invoke Message, the RTSM platform 6 calculates the call start time and the call duration. More specifically, the RTSM SIMapp Interface 49 maintains a timer value that corresponds to the time and date when the Internal Counter Value was conveyed to the SIMapp 16 during the last succession registration. Based on this time and date information, and the counter and rollover values stored in T1, T2 and T3, the RTSM SIMapp Interface 49 calculates the start time of the call (from either T1 or T2, as applicable) and the duration of the call (from T3 and T1 or T2). These calculated values are used by the RTSM SIMapp Interface 49 to rate the call, as previously discussed.

As depicted in step 182, the SIMapp 16 stores the Internal Timer Value that was communicated to the SIMapp 16 in the RTSM Registration Response Message or a constant Internal Timer Value if no such value is provided by the RTSM platform 6. In one embodiment, the SIMapp 16 stores a value of 86200 in the countdown timer 34, which corresponds to the number of seconds in a 24-hour period. The actual constant chosen for storage in the countdown timer 34 is a matter of design choice. The value stored in the countdown timer 34 defines the point in the future at which the countdown timer 34 will expire. The SIMapp 16 also clears the rollover count values for T1, T2 and T3 and starts the countdown timer 34. The countdown timer 34 runs continuously so that it can be sampled whenever the SIMapp 16 needs to populate a timer value for a call event.

If, in step 176, it is determined that the Power Loss Flag was not set on power-up, the SIMapp 16 stores the Internal Timer Value that was communicated to the SIMapp 16 in the RTSM Registration Response Message or a constant Internal Timer value if no such value is provided by the RTSM platform 6 and clears the rollover count values for T1, T2 and T3 and starts the countdown timer 34, as depicted in step 182.

As illustrated in step 184, the SIMapp 16 determines whether the countdown timer 34 has expired. If the countdown timer 34 has expired, the SIMapp 16 increments the rollover count and resets the countdown timer 34.

Figure 9:
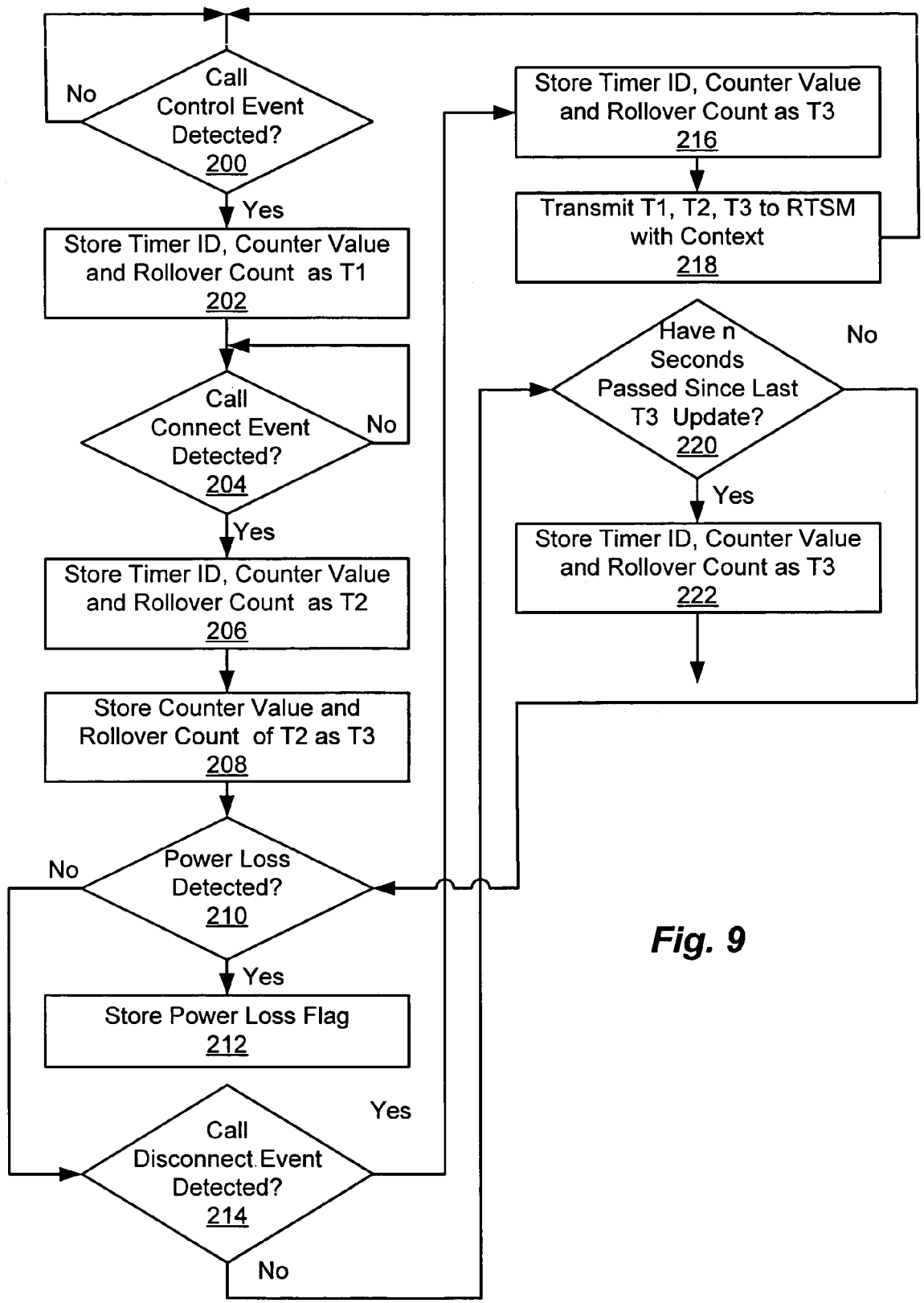
FIG. 9 is a flow diagram depicting the operation of the SIMapp and countdown timer in response to Call Control, Call Connect and Call Disconnect events.

FIG. 9 illustrates the operation and use of the countdown timer during call event processing. As illustrated in step 200, the SIMapp 16 awaits the occurrence of a Call Control event, i.e. the detection of a signal associated with the pressing of the SEND key on the wireless device 4 or the detection of a signal indicative of a page of the wireless device 4. Upon detection of the Call Control event, the SIMapp 16 stores the following values in the SIMapp Memory 20 as T1: the Timer ID ("1"), the current value of the countdown timer 34 and the current value of the rollover count as illustrated at step 202. The SIMapp 16 then awaits the occurrence of a Call Connect event, as depicted in step 204. The handset logic 10 generates the call connect event when a MO or MT call is connected and notifies the SIMapp 16 of the call connect event via the API. In response to the detection of the Call Connect event, the SIMapp 16 stores the following values within the data-set T2: the Timer ID ("2"), the current value of the countdown timer 34 and the current value of the rollover count, as depicted in step 206. The SIMapp 16 also stores the counter and rollover count values of T2 as the initial values within the T3 data-set, as shown at step 208.

The SIMapp 16 determines whether a Power Loss event has occurred, as illustrated in decision step 210. If the SIMapp 16 detects the occurrence of a power loss during the call or before T1, T2 and T3 have been forwarded to the RTSM SIMapp Interface 49 at the end of the call, the SIMapp 16 sets a Power Loss Flag within the non-volatile memory 20, as illustrated at step 212. If no power loss has occurred during the call, as illustrated at decision step 214, the SIMapp 16 determines whether a Call Disconnect event has occurred. If no Call Disconnect event has occurred, control passes to decision step 220 to determine if n seconds (n=30 seconds in the illustrative example) have passed since the last update of T3. If n seconds have passed, T3 is updated by storing the current countdown counter value and the current rollover count in T3, as depicted in step 222. If n seconds have not passed since the last update of T3, control returns to decision step 210.

If, in decision step 214, a determination is made that a Call Disconnect event (end of call) has been detected, the Timer ID ("3") and the current counter and rollover values are stored in the T3 data-set, as illustrated in step 216. While a call is in progress, the SIMapp 16 may increase the frequency at which it updates the counter and rollover count values within the T3 data-set to maintain more current and accurate counter values in the event of a power loss.

The SIMapp 16 transmits to the RTSM SIMapp Interface 49 a Service End Invoke Message that includes the T1, T2 and T3 data-sets and the relevant context information that identifies the call session, as shown in step 218.

The above-described counter operation may be employed in GSM-compliant phones and in cellular systems in which the SAT API between the SIM and the handset logic 10 supports counter management. Additionally, it should be recognized that the above-described functionality of the SIM 12 and SAT API 14 may be embedded within the handset logic 10 instead of in SIM 12.

Some wireless devices using other wireless protocols (e.g. the iDEN protocol) do not support SAT API commands for timer management. In such devices, rather than sampling countdown and rollover values in response to detecting specified events, the SIMapp 16 directly calculates values that corresponds to the counter and rollover count values in response to the detection of the specified call events. The calculated values equal the period of time from the current time to a specified point in the future. The specified point in the future is communicated to the SIMapp 16 by the RTSM platform 6 as the Internal Timer Value in the RTSM Registration Response Message. The Internal Timer Value specifies the number of seconds to add to the time at which the RTSM Registration Response was received by the SIMapp 16. This defines the specified point in the future. If no Internal Timer Value is specified by the RTSM platform 6, the specified point in the future is set by the SIMapp as 24 hours from the current time.

The SIMapp 16 calculates the number of seconds from a Call Control event, a Call Connect event, and a Call Disconnect event to the specified point in the future during both MO and MT calls. Each calculated value is recorded in the T1, T2 or T3 data-set, as applicable. This information is transmitted to the RTSM platform 6 in the Service End Invoke Message when the call disconnects, in the manner previously discussed.

A rollover count is also generated by the SIMapp 16. In one embodiment, each time the specified point in time is passed, the SIMapp 16 increments the rollover count so that the rollover count specifies the number of times the initially specified duration has occurred since the last registration. Thus, every time the specified duration is passed, it is extended by a predetermined period (e.g. 24 hours), and the rollover count is incremented by one. In an alternative embodiment, the SIMapp 16 checks if the rollover count needs to be incremented every time a timer value is calculated and recorded.

Timer Values

Table 4 defines the point within the call flow at which the timer value of T1, T2 and T3 are populated.

TABLE 4

|    | T1 | T2 | T3 |
|----|----|----|----|
| MO | Value at Call Control | Value at Call Connect | Value at Call Disconnect |
| MT | Value at Call Connect | Value at Call Connect | Value at Call Disconnect |

T1 and T2 are always the same for a MT call.

EXAMPLE

As an example of how T1, T2 and T3 would be populated, consider the situation in which: (a) the specified duration ends at midnight local time; (b) the handset is powered on at 23:40:30 local time; (c) a call is originated at 23:54:10 local time; (d) the call is answered 10 seconds later; and (e) the call lasts for 60 seconds. At the end of the call, T1, T2 and T3 values are as illustrated in Table 5 below:

TABLE 5

|  | T1 | T2 | T3 |
|---|---|---|---|
| Timer ID | 1 | 2 | 3 |
| Timer Value | 350 | 340 | 280 |
| Rollover Count | 0 | 0 | 0 |

If the subscriber initiates another, similar call at 23:59:50, T1, T2 and T3 values at the end of the cell as illustrated in Table 6 below:

TABLE 6

|  | T1 | T2 | T3 |
|---|---|---|---|
| Timer ID | 1 | 2 | 3 |
| Timer Value | 10 | 86,400 | 86,340 |
| Rollover Count | 0 | 1 | 1 |

Exemplary Services

The presently described system provides the capability of detecting predetermined events within the wireless device and communicating information pertaining to those events via a data message to a central server or subscriber management platform that provides a wide range of abilities, including control of the behavior of the wireless device, subscriber management and real-time account management. The following section provides examples of the services that can be provided using the presently disclosed architecture. The list is illustrative only, and is not intended to be exhaustive.

MO or MT Voice Call Control

One purpose of the disclosed system is to provide control of voice calls.

The SIMapp maintains configuration information that governs how specified events are to be processed. If a Mid-Service Disconnect status is set and the allotted time timer 35 expires before the call is otherwise disconnected, the SIMapp 16 disconnects the call.

When the Call Disconnect Event occurs, the SIMapp 16 performs the following tasks: (1) obtain and record the current value of T3; (2) format and send to the RTSM platform 6 a Service End Invoke Message containing the context information associated with the call, the T1, T2 and T3 data-sets, and the Disconnect Reason Code. The Service End Response Message may contain a message to display on the handset logic 10, e.g. the balance remaining.

It may be necessary for the SIMapp 16 to monitor more than one call simultaneously, as in the case of Call Waiting or Conference Calling. In these cases, it may be necessary for the SIMapp 16 to maintain separate sets of T1, T2 and T3 values along with context information for each call session.

As noted above, if the balance in the RTSM platform 6 is insufficient for a call, the call is disallowed or disconnected. The RTSM platform 6 can also selectively allow or disallow calls based on criteria other than a balance in an account associated with the user of the wireless device 4. In one embodiment, the RTSM platform 6 selectively allows or disallows calls based on a location of the wireless device 4. The DB 50a stores information identifying geographic regions, regions associated with various wireless carriers or other types of regions, from or to which calls are allowed and/or disallowed.

In another embodiment, the RTSM platform 6 selectively allows or disallows calls based on a list of permitted ("whitelisted") and/or forbidden ("blacklisted") parties. These lists identify the parties by their respective telephone numbers, caller ID names or other appropriate identification information.

In yet another embodiment, the RTSM platform 6 selectively allows or disallows calls based on a time of day of the calls. The DB 50a stores information identifying time periods, such as 9 a.m. to 5 p.m., weekends, or holidays during which calls are allowed and/or disallowed.

In another embodiment, the RTSM platform 6 selectively allows or disallows calls based on an amount of use of the wireless device 4 within a predetermined control period. For example, the RTSM platform 6 can allow up to a cumulative total of 1000 minutes of calls in each calendar month.

In other embodiments, the RTSM platform 6 selectively allows or disallows calls based on a Boolean combination of two or more criteria, such as those listed above or other criteria.

Over-the-Air Provisioning

As a result of updates or changes to the SIMapp 16, it may be desirable to alter the SIMapp 16 programming from time to time. For this reason, the network operator may update the SIMapp code image 16 over the air (OTA), as it is known in the art.

Handset Support Query

The SIMapp 16 is able to query the handset's capabilities and disable the handset in the event that it or the user's account does not meet some minimum criteria. This analysis is performed on power-up and is useful in reducing the likelihood of fraudulent use. In the event the query results in a determination that the minimum established criteria are not met, the handset logic 10 is disabled. The disabling of the handset logic 10 prevents it from being used to perform any MO or MT communications, such as voice, data bearer messaging (e.g. SMS), push to talk, wireless data, etc. Emergency numbers, such as 911 and other specified numbers, are always available.

SIMapp Configuration Data

The following configuration information defines how the SIMapp 16 operates under pre-specified conditions. This information can be changed during registration or via a Configuration Update message.

Trust Modes

When the SIM is first powered on, the SIMapp 16 enters its most recently configured trust mode. The Trust mode is set to either a Trusting Mode or a Non-Trusting Mode. In the Trusting Mode, the SIMapp 16 allows MO and MT calls even before a registration response is received from the RTSM platform 6. In the Non-Trusting Mode, the SIMapp 16 does not allow MO or MT calls to proceed until a registration response is received from the RTSM platform 6 that indicates that such calls are authorized. The default mode is the Non-Trusting Mode. The RTSM platform 6 may specify a trust mode in the RTSM Registration Response Message.

Registration Modes

The SIMapp 16 handles registration requests based on its currently configured registration mode. In one embodiment, the SIMapp 16 supports the Registration Modes discussed in Table 7 below.

TABLE 7

| Registration Mode | Description |
|---|---|
| Register on power up | Registration is performed on power up only. When this mode is in effect, location information is transmitted in every Service Start and/or Service End message. |
| Register on power up and location changes | Registration is performed on power up and every time the handset's location changes. When this mode is in effect, location information is not transmitted in each Service Start and Service End message. Note that Registration is not performed while a voice call is |

TABLE 7-continued

| Registration Mode | Description |
| --- | --- |
| | in progress. If the location at the end of a voice call is different from what it was at the start of the call, then the SIMapp 16 may include the new location in the Service End Invoke Message. Alternatively, a separate message containing location information can be sent after the Service End Invoke Message. |

The default mode is to register on power up and location changes. In one embodiment, the SIMapp 16 only registers on power up and upon location changes and location information is conveyed to the RTSM platform only in response to detection of the handset power up or a location change.

Pre-authorization Mode

The SIMapp 16 handles Service Start Request Messages based on its currently configured Pre-authorization Mode. The Pre-authorization Modes are as indicated in Table 8 below.

TABLE 8

| Pre-authorization Mode | Description |
| --- | --- |
| Allow all services until further notification | Allow MO and MT voice calls. No service start request needs to be generated. It is still possible that Service End requests are required based on the Service End Mode. |
| Deny all services until further notification | Deny MO and MT voice calls. No service start request needs to be generated. Only receipt of a Configuration Update request can "re-activate" the phone. |
| Perform Synchronous pre-authorization for this service | Check with the RTSM platform 6 before allowing a MO or MT call to proceed. Wait for the response before continuing. |
| Perform Asynchronous pre-authorization for this service | Check with the RTSM platform 6 in parallel with allowing a MO or MT call to proceed. Once the response is received, the call may be allowed to continue or terminated (based on the response). |

The default mode is to allow all service until further notification.

Service End Mode

The SIMapp 16 handles Service End Invoke Messages based on the currently configured Service End Mode. The Service End Mode may be specified as indicated in Table 9 below.

TABLE 9

| Service End Mode | Description |
| --- | --- |
| Notify when service is complete | Send call detail information when the call is disconnected. |
| Do not notify when service is complete | Do not send call detail information |

Allocation Depletion Mode

As noted, if a call is allowed, the SIMapp 16 may be provided with an allocated time for a call. In the event the allocated time is depleted, the Allocation Depletion Mode specifies how the call is to be handled by the SIMapp 16. The Allocation Depletion Mode may be configured as set forth in Table 10 below:

TABLE 10

| Allocation Depletion Mode | Description |
| --- | --- |
| Disconnect | End the call in progress when the allotted amount of time has expired. |
| Re-Authorize | Issue a new Service Start request to determine if the call is to continue |
| Off | Allow the current call to continue even if the allotted amount of time has expired. |

Re-Authorize Mode

If Pre-Authorization is in effect for MO or MT calls, and the Allocation Depletion action is "Re-Authorize," then the Maximum Call Length indicates the maximum amount of time before the SIMapp 16 is required to check with the RTSM platform 6 again. When this time expires, the SIMapp 16 generates a new Service Start Invoke Message. This process can continue multiple times until the subscriber's balance is exhausted or the call ends. The Service Start Invoke Response can indicate that the subscriber has no more money in one of two ways: (1) by returning a positive Maximum Call Duration, but with an indicator that Re-Authorization is no longer in effect (essentially saying "that's all the subscriber has left") or (2) by returning a zero Maximum Call Duration (essentially saying "the subscriber had some earlier, but it is all gone now"). When either of these indications occur, the action typically indicated is the disconnection of the call.

While the above-described system has been described in terms of a call, the presently disclosed system may be employed for detecting events pertaining to web browsing and other wireless data services and communicating information from a wireless device to a central server pertaining to such services for accounting and subscriber management functions. By way of example, the SIMapp 16 can detect browsing and, optionally, the amount of data retrieved by the browsing in packets, bytes, etc. Some communications, including some web browsing, do not have distinct start and end times. These communications can be treated as having only a start or only an end time. In response to the detection of the end of a browse, the SIMapp 16 may generate a data message to the RTSM SIM Interface 49 that indicates that a browse was initiated or ended. Optionally, the data message can include the number of bytes retrieved. The RTSM platform 6 may utilize the number of such browses, the number of bytes retrieved, the type of data retrieved (e.g., text, music, or video), etc. for accounting, based on wireless data rating information retained at the RTSM platform 6. Alternatively, rather than informing the RTSM platform 6 of each individual data transfer, the SIMapp 16 can seek pre-authorization for a number of browses and/or an amount of data that can be retrieved. The SIMapp 16 can store the pre-authorization amounts in the SIM. Then, as the user browses, the SIMapp 16 can deduct appropriate counts from the appropriate stored pre-authorization amount. If a stored pre-authorization amount becomes depleted or reaches a low threshold, the SIMapp 16 can seek addition authorization from the RTSM platform 6.

Embodiments of the presently disclosed system enable the RTSM platform 6 to receive real-time information concerning calls and other communications, for roaming and non-roaming wireless devices. The RTSM platform 6 can, therefore, collect this information and use it to perform call accounting. Alternatively or additionally, the RTSM platform 6 can use this information to generate and/or store call detail records (CDRs). The RTSM platform 6 can forward these CDRs to another accounting and/or billing system, such as one operated by a carrier or a third party.

The above-described system has been described in terms of calls, wireless data services and other communications that are successfully completed. For example, the RTSM platform 6 can debit the subscriber's account for MO or MT calls that are answered, but, in one embodiment, the RTSM platform 6 does not debit the subscriber's account for calls that are busy, intercepted or not answered. In another embodiment, the RTSM platform 6 can debit the subscriber's account for some or all communications, whether they are successfully completed or not.

It should be appreciated that modifications to and variations of the above-described methods and system may be made without departing from the inventive concepts disclosed herein. Accordingly, the invention is not to be viewed as limited except by the scope and spirit of the appended claims.

What is claimed is:

1. A wireless device operative in conjunction with an external server, comprising:

handset logic for communicating over a wireless network; and a removable module communicably coupled to said handset logic, said removable module comprising a memory containing an application program, and a processor operative to execute said application program, wherein, responsive to the execution of said application program, said processor included in said removable module is operative: to detect an occurrence of at least one predetermined event pertaining to a communication involving said wireless device and directed to, or initiated by, a user of said wireless device; and responsive to the detection of the occurrence of said at least one predetermined event:

to store information associated with said at least one predetermined event;

to generate a first data message that includes said information for transmission to said external server;

to initiate transmission of said data message from said handset logic to said external server over said wireless network; and to receive, via said handset logic, at least one second data message from said external server, said at least one second data message including at least one of a plurality of different directives to configure the operation of said wireless device, said at least one second data message being transmitted to said wireless device by said external server in response to the transmission of said first data message, wherein said at least one of said plurality of different directives included in said at least one second data message is generated by said external server based upon the information included in said first data message, each of said plurality of different directives being operative to direct said application program to perform at least one specified action corresponding to the respective directive, and wherein said plurality of different directives includes a first directive operative to direct said application program to perform a software reconfiguration of said removable module, and a second directive operative to direct said application program to re-route a current service to a specified address.

2. The wireless device of claim 1, wherein said communication is a call having a call start and a call end.

3. The wireless device of claim 2, wherein said call is successfully completed.

4. The wireless device of claim 2, wherein said at least one predetermined event comprises said call end, and, responsive to the execution of said application program, said processor included in said removable module is operative to generate said first data message in response to the detection of said call end.

5. The wireless device of claim 4, wherein said information includes at least one value indicative of a duration associated with said call.

6. The wireless device of claim 5, wherein said wireless device includes a timer, said at least one predetermined event includes first and second events corresponding to said call start and said call end respectively, and, responsive to the execution of said application program, said processor included in said removable module is further operative to obtain first and second timer values from said timer in response to the occurrence of said first and second events, wherein said information includes said first and second timer values and a difference between said first and second timer values is indicative of said duration associated with said call.

7. The wireless device of claim 6, wherein said first event comprises one of a call control event and a call connect event.

8. The wireless device of claim 7, wherein said call control event comprises one of an initiation of a call for a mobile originated call and a page of said wireless device for a mobile terminated call.

9. The wireless device claim 6, wherein said first and second timer values are real times at which said first and second events occur, respectively.

10. The wireless device of claim 2, wherein said wireless device includes a timer, said at least one predetermined event includes first and second events corresponding to said call start and said call end respectively, and, responsive to the execution of said application program, said processor included in said removable module is further operative to obtain first and second timer values from said timer in response to the occurrence of said first and second events, wherein said information comprises a value indicative of a duration associated with said call derived from said first and second timer values.

11. The wireless device of claim 10, wherein said first event comprises one of a call control event and a connect event.

12. The wireless device of claim 11, wherein said call control event comprises one of an initiation of a call for a mobile originated call and a page of said wireless device for a mobile terminated call.

13. The wireless device of claim 2, wherein said information associated with said at least one predetermined event includes a value indicative of a duration associated with said call.

14. The wireless device of claim 1, wherein said communication comprises retrieving data from a server in response to a request by said user, said at least one predetermined event comprises said request by said user, and said information is indicative of one or more of an occurrence of said request and an amount of data retrieved from said server.

15. The wireless device of claim 1, wherein said removable module comprises a subscriber identity module (SIM).

16. The wireless device of claim 1, wherein said removable module comprises a universal subscriber identity module (USIM).

17. The wireless device of claim 1, wherein said removable module comprises a removable universal identification module (R-UIM).

18. A method of operating a wireless device that includes a removable module communicably coupled to handset logic, said wireless device being operative in conjunction with an external server said method comprising the steps of:
   in a detecting step, detecting an occurrence of at least one predetermined event pertaining to a communication involving said wireless device and directed to, or initiated by, a user of said wireless device, said detecting step being performed utilizing a processor in said removable module executing an application program stored within a first memory portion of said removable module; and
   responsive to the detecting of the occurrence of said at least one predetermined event:
   storing in a second memory portion of said removable module, utilizing said processor executing said application program, information associated with said at least one predetermined event;
   generating, utilizing said processor executing said application program, a first data message that includes said information for transmission to said external server;
   initiating, utilizing said processor executing, said application program, transmission of said first data message to said external server as a wireless RF message;
   receiving, via said handset logic, at least one second data message from said external server, said at least one second data message including at least one of a plurality of different directives to configure the operation of said wireless device, said at least one second data message being transmitted to said wireless device by said external server in response to the transmission of said first data message,
   wherein said at least one of said plurality of different directives included in said at least one second data message is generated by said external server based upon the information included in said first data message; and
   in a directing step, directing, by said at least one of said plurality of different directives, said application program to perform at least one specified action corresponding to the respective directive; and
   wherein said directing step includes directing, by said at least one of said plurality of different directives to configure the operation of said wireless device, said application program to perform at least one specified action corresponding to the respective directive, said plurality of different directives including a first directive operative to direct said application program to perform a software reconfiguration of said removable module, and a second directive operative to direct said application program to re-route a current service to a specified address.

19. The method of claim 18, wherein said communication has a call start and a call end, and said detecting step comprises detecting said call end.

20. The method of claim 19, wherein said storing information comprises storing at least one value indicative of a duration associated with said call.

21. The method of claim 19, wherein said predetermined event comprises first and second events corresponding to said call start and said call end, respectively, said method further comprising obtaining first and second timer values in response to the occurrence of said first and second events, wherein said information includes said obtained first and second timer values.

22. The method of claim 19, wherein said predetermined event comprises first and second events corresponding to said call start and said call end, respectively, said method further comprises deriving a value indicative of a duration associated with said call, wherein said information includes said derived value.

23. The method of claim 22, wherein said detecting step comprises detecting one or more of a call control event and a call connect event.

24. The method of claim 23, wherein said detecting step comprises detecting one or more of an initiation of a call for a mobile originated call and a page of said wireless device for a mobile terminated call.

25. The method of claim 19, wherein said generating step comprises generating a data message that includes at least one value indicative of a duration associated with said call.

26. The method of claim 18, wherein said communication has a call start and a call end, said call is successfully completed, and said detecting step comprises detecting said call end upon the successful completion of said call.

27. The method of claim 18, wherein said removable module comprises a subscriber identity module (SIM).

28. The method of claim 18, wherein said removable module comprises a universal subscriber identity module (USIM).

29. The method of claim 18, wherein said removable module comprises a removable universal identification module (R-UIM).

30. A removable module for communicably coupling to a wireless communication device, said wireless communication device being operative in conjunction with an external server, comprising:
   a memory containing an application program; and
   a processor operative to execute said application program,
   wherein, responsive to the execution of said application program, said processor included in said removable module is operative:
   to detect an occurrence of at least one predetermined event pertaining to a communication involving said wireless communication device and directed to, or initiated by, a user of said wireless communication device; and
   responsive to the detection of the occurrence of said at least one predetermined event:
   to store information associated with said at least one predetermined event;
   to generate a first data message that includes said information for transmission to said external server;
   to initiate transmission of said first data message from said wireless communication device to said external server over a wireless network; and
   to receive at least one second data message from said external server, said at least one second data message including one or more of a plurality of different directives to configure the operation of said wireless device, said at least one second data message being transmitted to said wireless device by said external server in response to the transmission of said first data message,
   wherein said one or more of said plurality of different directives included in said at least one second data message is generated by said external server based upon the information included in said first data message, each of said plurality of different directives being operative to direct said application program to perform at least one specified action corresponding to the respective directive, and wherein said plurality of different directives includes one or more of a first directive operative to direct said application program to perform a software reconfiguration of said removable module, and a second directive operative to direct said application program to re-route a current service to a specified address.

31. The removable module of claim 30, wherein said communication is a call having a call start and a call end.

32. The removable module of claim 31, wherein said call is successfully completed.

33. The removable module of claim 31, wherein said at least one predetermined event comprises said call end, and wherein, responsive to the execution of said application program, said processor included in said removable module is operative to generate said first data message in response to the detection of said call end.

34. The removable module of claim 33, wherein said information includes at least one value indicative of a duration associated with said call.

35. The removable module of claim 31, wherein said at least one predetermined event includes first and second events corresponding to said call start and said call end respectively, and wherein, responsive to the execution of said application program, said processor included in said removable module is further operative to obtain first and second timer values in response to the occurrence of said first and second events, wherein said information includes said first and second timer values, and a difference between said first and second timer values is indicative of a duration associated with said call.

36. The removable module of claim 35, wherein said first event comprises one of a call control event and a connect event.

37. The removable module of claim 36, wherein said call control event comprises one of an initiation of a call for a mobile originated call and a page of said wireless device for a mobile terminated call.

38. The removable module of claim 31, wherein said at least one predetermined event includes first and second events corresponding to said call start and said call end respectively, and wherein, responsive to the execution of said application program, said processor included in said removable module is further operative to obtain first and second timer values in response to the occurrence of said first and second events, wherein said information comprises a value indicative of a duration associated with said call derived from said first and second timer values.

39. The removable module of claim 38, wherein said first event comprises one of a call control event and a connect event.

40. The removable module of claim 39, wherein said call control event comprises one of an initiation of a call for a mobile originated call and a page of said wireless device for a mobile terminated call.

41. The removable module of claim 31, wherein said information associated with said at least one predetermined event includes a value indicative of a duration associated with said call.

42. The removable module of claim 30, wherein said communication comprises retrieving data from a server in response to a request by said user, said at least one predetermined event comprises said request by said user, and said information is indicative of one or more of an occurrence of said request and an amount of data retrieved from said server.

43. The removable module of claim 30, wherein said memory and said processor are parts of a subscriber identity module (SIM).

44. The removable module of claim 30, wherein said memory and said processor are parts of a universal subscriber identity module (USIM).

45. The removable module of claim 30, wherein said memory and said processor are parts of a removable universal identification module (R-UIM).

46. A wireless device operative in conjunction with an external server, comprising:

a first memory portion, a second memory portion, and a processor, said first memory portion containing an application program, said processor being operative to execute said application program, wherein, responsive to the execution of said application program, said processor included in said wireless device is operative:

to detect an occurrence of at least one predetermined event pertaining to a communication involving said wireless device and directed to, or initiated by, a user of said wireless device; and responsive to the detection of the occurrence of said at least one predetermined event:

to store information associated with said at least one predetermined event within said second memory portion within said wireless device;

to generate a first data message that includes said information for transmission to said external server;

to initiate transmission of said first data message to said external server as a wireless RF message; and to receive at least one second data message from said external server, said at least one second data message including one or more of a plurality of different directives to configure the operation of said wireless device, said at least one second data message being transmitted to said wireless device by said external server in response to the transmission of said first data message, wherein said one or more of said plurality of different directives included in said at least one second data message is generated by said external server based upon the information included in said first data message, each of said plurality of different directives being operative to direct said application program to perform at least one specified action corresponding to the respective directive, and wherein said plurality of different directives includes one or more of a first directive operative to direct said application program to perform a software reconfiguration of said wireless device, and a second directive operative to direct said application program to re-route a current service to a specified address.

47. The wireless device of claim 46, wherein said communication is a call having a call start and a call end.

48. The wireless device of claim 47, wherein said call is successfully completed.

49. The wireless device of claim 48, wherein said information includes at least one value indicative of a duration associated with said call.

50. The wireless device of claim 47, wherein said at least one predetermined event comprises said call end, and wherein, responsive to the execution of said application program, said processor included in said wireless device is operative to generate said first data message in response to a detection of said call end.

51. The wireless device of claim 47, wherein said wireless device includes a timer, said at least one predetermined event includes first and second events corresponding to said call start and said call end, respectively; and wherein, responsive to the execution of said application program, said processor included in said wireless device is further operative to obtain first and second timer values from said timer in response to an occurrence of said first and second events, wherein said information includes said first and second timer values and a difference between said first and second timer values is indicative of a duration associated with said call.

52. The wireless device of claim 51, wherein said first event comprises one of a call control event and a connect event.

53. The wireless device of claim 52, wherein said call control event comprises one of an initiation of a call for a mobile originated call and a page of said wireless device for a mobile terminated call.

54. The wireless device of claim 47, wherein said wireless device includes a timer, said at least one predetermined event includes first and second events corresponding to said call start and said call end respectively, and wherein, responsive to the execution of said application program, said processor included in said wireless device is further operative to obtain first and second timer values from said timer in response to the occurrence of said first and second events, wherein said information comprises a value indicative of a duration associated with said call derived from said first and second timer values.

55. The wireless device of claim 54, wherein said first event comprises one of a call control event and a connect event.

56. The wireless device of claim 55, wherein said call control event comprises one of an initiation of a call for a mobile originated call and a page of said wireless device for a mobile terminated call.

57. The wireless device of claim 47, wherein said information associated with said at least one predetermined event includes a value indicative of a duration associated with said call.

58. The wireless device of claim 46, wherein said communication comprises retrieving data from a server in response to a request by said user, said at least one predetermined event comprises request by said user, and said information is indicative of one or more of an occurrence of said request and an amount of data retrieved from said server.

59. A method for communicating information between a wireless device and an external server, said wireless device including a processor and a memory, said method comprising the steps of:

detecting an occurrence of at least one predetermined event pertaining to a communication involving said wireless device and directed to, or initiated by, a user of said wireless device utilizing said processor executing an application program contained within said memory included in said wireless device; and in response to the detecting of the occurrence of said at least one predetermined event:

storing, utilizing said processor executing said application program, information associated with said at least one predetermined event within said memory included in said wireless device;

generating, utilizing said processor executing said application program, a first data message that includes said information for transmission to said external server;

initiating, utilizing said processor executing said application program, transmission of said first data message to said external server;

receiving, at said wireless device, at least one second data message from said external server, said at least one second data message including one or more of a plurality of different directives to configure the operation of said wireless device, said at least one second data message being transmitted to said wireless device by said external server in response to the transmission of said first data message, wherein said one or more of said plurality of different directives included in said at least one second data message is generated by said external server based upon the information included in said first data message; and directing, by said one or more of said plurality of different directives, said application program to perform at least one specified action corresponding to the respective directive, wherein said plurality of different directives includes one or more of a first directive operative to direct said application program to perform a software reconfiguration of said wireless, and a second directive operative to direct said application program to re-route a current service to a specified address.

60. The method of claim 59, wherein said communication has a call start and a call end and said detecting the occurrence of at least one predetermined event comprises detecting said call end.

61. The method of claim 60, wherein said storing information comprises storing at least one value indicative of a duration associated with said call.

62. The method of claim 60, wherein said predetermined event comprises first and second events corresponding to said call start and said call end, respectively; and further comprising obtaining first and second timer values in response to an occurrence of said first and second events, wherein said information includes said obtained first and second timer values.

63. The method of claim 60, wherein said predetermined event comprises first and second events corresponding to said call start and said call end, respectively; and further comprises deriving a value indicative of a duration associated with said call, wherein said information includes said derived value.

64. The method of claim 63, wherein said detecting the occurrence of at least one predetermined event comprises detecting a call control event or a connect event.

65. The method of claim 64, wherein said detecting the occurrence of at least one predetermined event comprises detecting an initiation of a call for a mobile originated call or a page of said wireless device for a mobile terminated call.

66. The method of claim 60, wherein said generating a first data message comprises generating a data message that includes at least one value indicative of a duration associated with said call.

67. The method of claim 59, wherein said communication has a call start and a call end, said call is successfully completed and said detecting the occurrence of at least one predetermined event comprises detecting said call end.

68. The method of claim 59, wherein the detecting of said occurrence of at least one predetermined event, the storing of said information and said first data message generating are performed by an application program resident in a removable module within said wireless device.

69. The method of claim 68, wherein said removable module comprises a subscriber identity module (SIM).

70. The method of claim 68, wherein said removable module comprises a universal subscriber identity module (USIM).

71. The method of claim 68, wherein said removable module comprises a removable universal identification module (R-UIM).

72. A method of operating a wireless device for use with a call accounting system, said wireless device including a processor and a memory, said method comprising the steps of:

detecting, utilizing said processor executing an application program contained in the memory of said wireless device, a first event associated with a start of a communication involving the wireless device and directed to, or initiated by, a user of said wireless device, and a second event associated with an end of said communication; and in response to the detecting of said first and second events:

obtaining, utilizing said processor executing said application program, information indicative of a duration associated with said communication;

initiating, utilizing said processor executing said application program, transmission of a first data bearer message from the wireless device to said call accounting system, said first message including at least said information indicative of the duration associated with said communication;

receiving, at said wireless device, at least one second data message from said call accounting system, said at least one second data message including one or more of a plurality of different directives to configure the operation of said wireless device, said at least one second data message being transmitted to said wireless device by said call accounting system in response to the transmission of said first data bearer message, wherein said at least one instruction included in said at least one second data message is generated by said call accounting system based upon the information included in said first data bearer message; and directing, by said one or more said plurality of different directives, said application program to perform at least one specified action corresponding to the respective directive, wherein said plurality of different directives includes one or more of a first directive operative to direct said application program to perform a software reconfiguration of said wireless device, and a second directive operative to direct said application program to re-route a current service to a specified address.

73. The method of claim 72, wherein said information obtaining step comprises:

obtaining a first counter value from a counter in said wireless device in response to the detection of said first event; and obtaining a second counter value from said counter in response to the detection of said second event;

wherein a difference between said first and second counter values is indicative of the duration associated with said communication and wherein said sending step comprises sending said first and second counter values to an external data processing platform in response to the detection of said second event.

74. The method of claim 72, further comprising:

receiving said first data bearer message at said external data processing platform; and utilizing said first and second counter values at said external data processing platform to perform said call accounting for said communication.

75. The method of claim 72 wherein said information obtaining step comprises;

obtaining a first counter value from a counter in said wireless device in response to the detection of said first event;

obtaining a second counter value from said counter in response to the detection of said second event; and generating a difference value indicative of the duration associated with said communication from said first and second counter values; and wherein said sending step comprises sending said difference value to an external data processing platform in response to the detection of said second event.

76. The method of claim 72, further comprising:

storing a first counter value obtained from a counter in said wireless device in response to the detection of said first event;

storing a second counter value obtained from said counter in response to the detection of said second event;

wherein a difference between said first and second counter values is indicative of the duration associated with said communication and sad information comprises at least said first and second counter values.

77. The method of claim 72, wherein said first event comprises one of an initiation of a mobile originated call and a page of said wireless device for a mobile terminated call; and said second event comprises an end of said call for either a mobile terminated call or a mobile originated call.

78. The method of claim 72, wherein said first event comprises connection of said communication for either a mobile originated call or a mobile terminated call; and said second event comprises an end of said call for either a mobile terminated call or a mobile originated call.

79. A subscriber management and accounting system, comprising;

a wireless communication network;

a management platform including a text messaging gateway; and a wireless device communicating with the management platform over the wireless communication network, the wireless device including a removable module comprising:

a memory containing an application program; and a processor operative to execute said application program, wherein, responsive to the of said application program, said processor included in said removable module is operative:

to detect an occurrence of at least one predetermined event pertaining a to a communication involving said wireless device and directed to, or initiated by, a user of said wireless device; and in response the detection of the occurrence of said at least one predetermined event:

to store information associated with said at least one predetermined event;

to initiate transmission of a first data message that includes said information over said wireless communication network to said management platform via said text messaging gateway;

to receive, via said text messaging gateway, at least one second data message from said management platform, said at least one second data message including one or more of a plurality of different directives to configure the operation of said wireless device, said at one, second data message being transmitted, to said device by said management platform in response to the transmission of said first data message;

wherein said one or more of said plurality of different directives included in said at least one second data message is generated by said management platform based upon the information included in said first data message, each of said plurality of different directives being operative to direct said application program to perform at least one specified action corresponding to the respective directive, and wherein said plurality of different directives includes one or more of a first directive operative to direct said application program to perform a software reconfiguration of said removable module, and a second directive operative to direct said application program to re-route a current service to a specified address.

80. The subscriber management and accounting system of claim 79, wherein said management platform is configured to allow or deny said communication based on a balance in an account associated with said user.

81. The subscriber management and accounting system of claim 79, wherein said removable module comprises a subscriber identity module (SIM).

82. The subscriber management and accounting system of claim 79, wherein said removable module comprises a universal subscriber identity module (USIM).

83. The subscriber management and accounting system of claim 79, wherein said removable module comprises a removable universal identification module (R-UIM).

84. The subscriber management and accounting system of claim 79, wherein said first data message is formatted as a text message.

85. The subscriber management and accounting system of claim 84, wherein said first data message is formatted as an SMS message.

86. The subscriber management and accounting system of claim 79, wherein said wireless device is configurable to:
in a first trust mode, allow communications directed to, or initiated by, a user of said wireless device without first receiving a registration response from said management platform, and
in a second trust mode, disallow said communications without first receiving a registration response from said management platform.

87. The subscriber management and accounting system of claim 86, wherein said trust mode is configurable via a command message from said management platform.

88. The subscriber management and accounting system of claim 79, wherein a registration mode of said wireless device controls whether said wireless device registers or does not register with said management platform upon detecting a change in location of said wireless device.

89. The subscriber management and accounting system of claim 88, wherein said registration mode is configurable via a command message from said management platform.

90. The subscriber management and accounting system of claim 79, wherein a pre-authorization mode of said wireless device controls whether said wireless device requires or does not require authorization from said management platform before allowing communications directed to, or initiated by, a user of said wireless device.

91. The subscriber management and accounting system of claim 90, wherein said pre-authorization mode is configurable via a command message from said management platform.

92. The subscriber management and accounting system of claim 79, wherein a pre-authorization mode of said wireless device controls whether said wireless device allows or does not allow communications directed to, or initiated by, the user of said wireless device to begin without first receiving authorization from said management platform.

93. The subscriber management and accounting system of claim 92, wherein said pre-authorization mode is configurable via a command message from said management platform.

94. The subscriber management and accounting system of claim 79, wherein, in one of a plurality of pre-authorization modes of said wireless device, said wireless device allows a communication directed to, or initiated by, the user of said wireless device to begin without first receiving authorization from said management platform, and said wireless device is configured to end said communication, if so instructed by said management platform.

95. The subscriber management and accounting system of claim 79, wherein a mode of said wireless device is configurable to allow communications directed to, or initiated by, the user of said wireless device to begin without first sending the first data message to said management platform.

96. The subscriber management and accounting system of claim 95, wherein said mode is configurable via a command message from said management platform.

97. The subscriber management and accounting system of claim 79, wherein said wireless device is configured to:
in a first allotted timer expiration mode, end a communication directed to, or initiated by, the user of said wireless device after expiration an allotted time;
in a second allotted timer expiration mode, seek re-authorization from said management platform to continue said communication; and
in a third allotted timer expiration mode, allow said communication to continue without seeking said re-authorization from said management platform.

98. A wireless device operative in conjunction with an external server, comprising:
a first memory portion, a second memory portion, and a processor, said first memory portion containing an application program, said processor being operative to execute said application program,
wherein, responsive to the execution of said application program, said processor included in said wireless device is operative:
to detect an occurrence of at least one predetermined event pertaining to a communication involving said wireless device and directed to, or initiated by, a user of said wireless device; and
responsive to the detection of the occurrence of said at least one predetermined event:
to store information associated with said at least one predetermined event within said second memory portion within said wireless device;
to generate a first data message that includes said information for transmission to said external server;
to initiate transmission of said first data message to said external server as a wireless RF message; and
to receive at least one second data message from said external server, said at least one second data message including at least one directive to configure the operation of said wireless device, said at least one second data message being transmitted to said wireless device by said external server in response to the transmission of said first data message,
wherein said at least one directive include in said at least one second data message is generated by said external server based upon the information included in said first data message, each of said at least one directive being operative to direct said application program to perform at least one specified action corresponding to the respective directive, and wherein said at least one directive includes a first directive operative to direct said application program to perform a software reconfiguration of said wireless device.

99. A wireless device operative in conjunction with an external server, comprising:

a first memory portion, a second memory portion, and a processor, said first memory portion containing an application program, said processor being operative to execute said application program, wherein, responsive to the execution of said application program, said processor included in said wireless device is operative:

to detect an occurrence of at least one predetermined event pertaining to a communication involving said wireless device and directed to, or initiated by, a user of said wireless device; and responsive to the detection of the occurrence of said at least one predetermined event:

to store information associated with said at least one predetermined event within said second memory portion within said wireless device;

to generate a first data message that includes said information for transmission to said external server;

to initiate transmission of said first data message to said external server as a wireless RF message; and to receive at least one second data message from said external server, said at least one second data message including at least one directive to configure the operation of said wireless device, said at least one second data message being transmitted to said wireless device by said external server in response to the transmitted of said first data message, wherein said at least one directive included in said at least one second data message is generated by said external server based upon the information included in said first data message, each of said at least one directive being operative to direct said application program to perform at least one specified action corresponding to the respective directive, and wherein said at least one directive includes a first directive operative to direct said application program to re-route a current server to a specified address.

* * * * *